US009915529B2

(12) United States Patent
Higuchi

(10) Patent No.: US 9,915,529 B2
(45) Date of Patent: Mar. 13, 2018

(54) TIDAL CURRENT METER

(71) Applicant: HONDA ELECTRONICS CO., LTD., Toyohashi-shi, Aichi-Ken (JP)

(72) Inventor: Kazuki Higuchi, Toyohashi (JP)

(73) Assignee: HONDA ELECTRONICS CO., LTD., Toyohashi-shi (JP)

(*) Notice: Subject to any disclaimer, the term of this patent is extended or adjusted under 35 U.S.C. 154(b) by 99 days.

(21) Appl. No.: 15/000,151

(22) Filed: Jan. 19, 2016

(65) Prior Publication Data
US 2016/0216111 A1    Jul. 28, 2016

(30) Foreign Application Priority Data

Jan. 22, 2015 (JP) ................. 2015-010577

(51) Int. Cl.
G01P 5/00    (2006.01)
G01C 13/00    (2006.01)
G01P 5/24    (2006.01)
G01S 7/521    (2006.01)
G01S 15/58    (2006.01)

(52) U.S. Cl.
CPC ............ G01C 13/006 (2013.01); G01P 5/241 (2013.01); G01S 7/521 (2013.01); G01S 15/582 (2013.01); G01S 15/588 (2013.01)

(58) Field of Classification Search
None
See application file for complete search history.

(56) References Cited

U.S. PATENT DOCUMENTS 3,740,704 A * 6/1973 Suter ................. G01S 15/523
                                                    367/112
5,561,641 A   10/1996 Nishimori et al.
(Continued)

FOREIGN PATENT DOCUMENTS

CN    103217680 A       7/2013
GB        2437619 A  * 10/2007 ........... G01S 15/586
(Continued)

OTHER PUBLICATIONS

Extended European Search Report dated Apr. 4, 2016, issued in counterpart European Application No. 16150137.4 (7 pages).
(Continued)

Primary Examiner — Andre Allen
(74) Attorney, Agent, or Firm — Westerman, Hattori, Daniels & Adrian, LLP

(57) ABSTRACT

Disclosed is a tidal current meter that measures the velocity of a tidal current. The tidal current meter includes an oscillator, a calculation section, a depression angle setup section, and a drive section. The oscillator is capable of transmitting an ultrasonic wave into water and receiving the reflection of the transmitted ultrasonic wave. The calculation section calculates the velocity in accordance with the Doppler shift frequency of the reflection received by the oscillator. The depression angle setup section sets a depression angle, that is, the angle formed by the transmission direction of the ultrasonic wave and a horizontal plane. The drive section drives the oscillator in such a manner as to transmit the ultrasonic wave and receive the reflection of the transmitted ultrasonic wave at the depression angle set by the depression angle setup section.

12 Claims, 9 Drawing Sheets

(56) References Cited

U.S. PATENT DOCUMENTS

| | | | | |
|---|---|---|---|---|
| 5,777,892 A | * | 7/1998 | Nabity | G01F 1/002 |
| | | | | 702/143 |
| 2013/0041599 A1 | * | 2/2013 | Rick | G01F 1/002 |
| | | | | 702/45 |

FOREIGN PATENT DOCUMENTS

| | | |
|---|---|---|
| JP | 2010-145222 A | 7/2010 |
| JP | 2011-89800 A | 5/2011 |
| JP | 2011-203276 A | 10/2011 |
| JP | 2014-232045 A | 12/2014 |

OTHER PUBLICATIONS

Office Action dated Jan. 26, 2016, issued in counterpart Japanese Application No. 2015-010577, with English translation (9 pages).

* cited by examiner

| ANALYSIS DEPTH [m] | DEPRESSION ANGLE [DEG.] |
|---|---|
| 10 | 30 |
| 20 | 30 |
| 30 | 35 |
| 40 | 40 |
| 50 | 45 |
| 60 | 50 |
| 70 | 55 |
| 80 | 60 |
| 90 | 60 |
| 100 | 60 |

TIDAL CURRENT METER

BACKGROUND OF THE INVENTION (1) Field of the Invention

The present invention relates to a tidal current meter that measures the velocity of a tidal current at a predetermined depth of water such as the ocean or a lake.

(2) Description of the Related Art

A well-known tidal current meter described, for instance, in Japanese Unexamined Patent Application Publication No. 2011-203276 transmits an ultrasonic wave into water, receives a wave reflected, for example, from clutter, and measures the velocity of a tidal current at a predetermined depth in the water in accordance with the Doppler shift frequency of the reflected wave.

A conventional tidal current meter is configured so that three oscillators are mounted, for example, on the bottom of a ship and positioned 120 degrees apart from each other when the surface of water is viewed from above. The tidal current meter is configured so that the three oscillators transmit an ultrasonic wave in directions 120 degrees apart from each other at a fixed depression angle θ (a tilt angle or other angle formed by the direction of ultrasonic wave transmission and the surface of water (horizontal plane) on which the ship is floating) in order to let each of the oscillators receive a wave reflected from clutter (for example, plankton) existing at a target depth for measurement.

Then, in accordance with the Doppler shift frequency of the reflected wave received by each of the oscillators, the tidal current meter calculates the velocity of a tidal current at the target depth for measurement.

In order to be able to measure the velocity of a tidal current at a deep place, the conventional tidal current meter causes the ultrasonic wave to reach the deep place by using a fixed depression angle θ of approximately 60 degrees. In this instance, however, it is difficult to measure the velocity of a tidal current at a small depth (hereinafter may be referred to as a shallow place) for the following reason.

When the conventional tidal current meter transmits the ultrasonic wave from the oscillators, a wave reflected from clutter at a shallow place reaches the oscillators immediately. In order to enable the oscillators to receive the reflected wave, therefore, it is necessary to reduce the pulse width of the ultrasonic wave transmitted by the oscillators (shorten the time of ultrasonic wave transmission) or reduce the width of frequency analysis required for calculating the Doppler shift frequency (decrease the number of data used for frequency analysis). However, such pulse width reduction and frequency analysis width reduction will decrease the frequency resolution, resulting in the failure to properly measure the Doppler shift frequency. This makes it difficult to measure the tidal current at a shallow place.

SUMMARY OF THE INVENTION

The present invention has been made in view of the above circumstances, and provides a tidal current meter that is capable of accurately measuring the velocity of a tidal current not only at a deep place but also at a shallow place.

According to an aspect of the present invention, there is provided a tidal current meter that measures the velocity of a tidal current. The tidal current meter includes an oscillator, a calculation section, a depression angle setup section, and a drive section. The oscillator is capable of transmitting an ultrasonic wave into water and receiving its reflection. The calculation section calculates the velocity in accordance with the Doppler shift frequency of the reflected wave received by the oscillator. The depression angle setup section sets a depression angle that is formed by the transmission direction of the ultrasonic wave and a horizontal plane. The drive section drives the oscillator in such a manner as to transmit the ultrasonic wave and receive its reflection at the depression angle set by the depression angle setup section. Here, the tidal current is a concept that includes not only a tidal current in the ocean but also the current of water, for example, in a lake, a pond, or a river. Further, the velocity calculated by the calculation section includes the speed and direction of the tidal current.

Consequently, the oscillator capable of transmitting the ultrasonic wave into water and receiving its reflection is incorporated. In accordance with the Doppler shift frequency of the reflected wave received by the oscillator, the calculation section calculates the velocity of the tidal current. Here, the depression angle formed by the transmission direction of the ultrasonic wave and the horizontal plane is set by the depression angle setup section. The oscillator is driven in such a manner as to transmit the ultrasonic wave and receive its reflection at the depression angle set by the depression angle setup section. This makes it possible to change the depression angle for the transmission direction of the ultrasonic wave and the reception direction of its reflection in accordance with a target water depth for measurement.

Hence, when the velocity of a tidal current at a deep place is to be measured, the depression angle can be set to a great value so that the ultrasonic wave reaches the deep place. When, by contrast, the velocity of a tidal current at a shallow place is to be measured, the depression angle can be set to a small value so as to increase the time interval between the instant at which the oscillator transmits the ultrasonic wave and the instant at which a wave reflected from clutter at the shallow place reaches the oscillator. Consequently, even when the velocity of a tidal current at a shallow place is to be measured, the pulse width of the ultrasonic wave and the frequency analysis width required to measure the Doppler shift frequency can be increased. This makes it possible to avoid a decrease in frequency resolution. Further, velocity resolution itself can be increased by setting a small depression angle for the transmission direction of the ultrasonic wave and the reception direction of its reflection. This produces the effect of being able to accurately measure the velocity of a tidal current not only at a deep place but also at a shallow place.

BRIEF DESCRIPTION OF THE DRAWINGS

Embodiments of the present invention will be described in detail based on the following figures, in which.

DETAILED DESCRIPTION OF THE INVENTION

Figure 1:
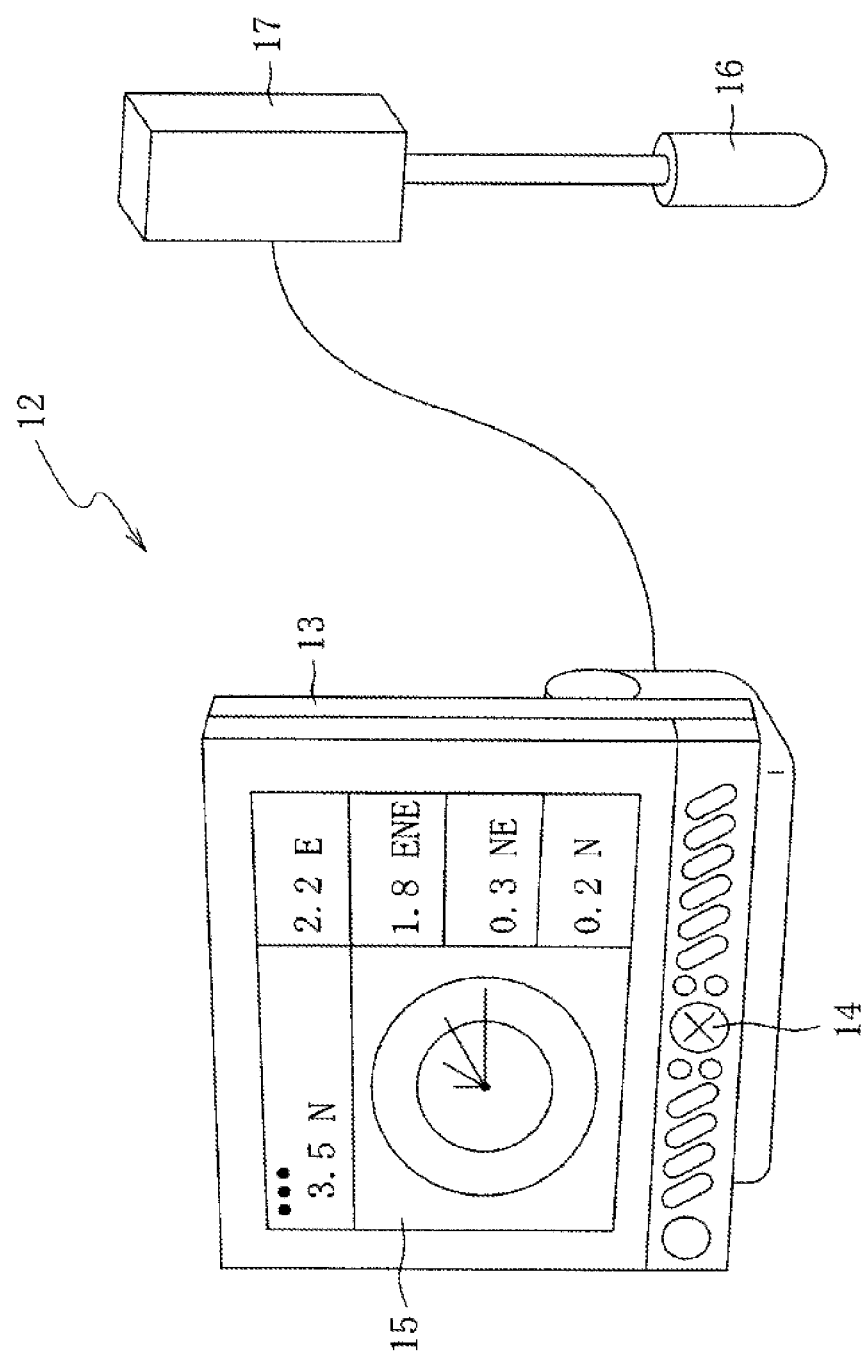
FIG. 1 is a schematic diagram illustrating an outline configuration of a tidal current meter according to a first embodiment of the present invention.
Figure 2:
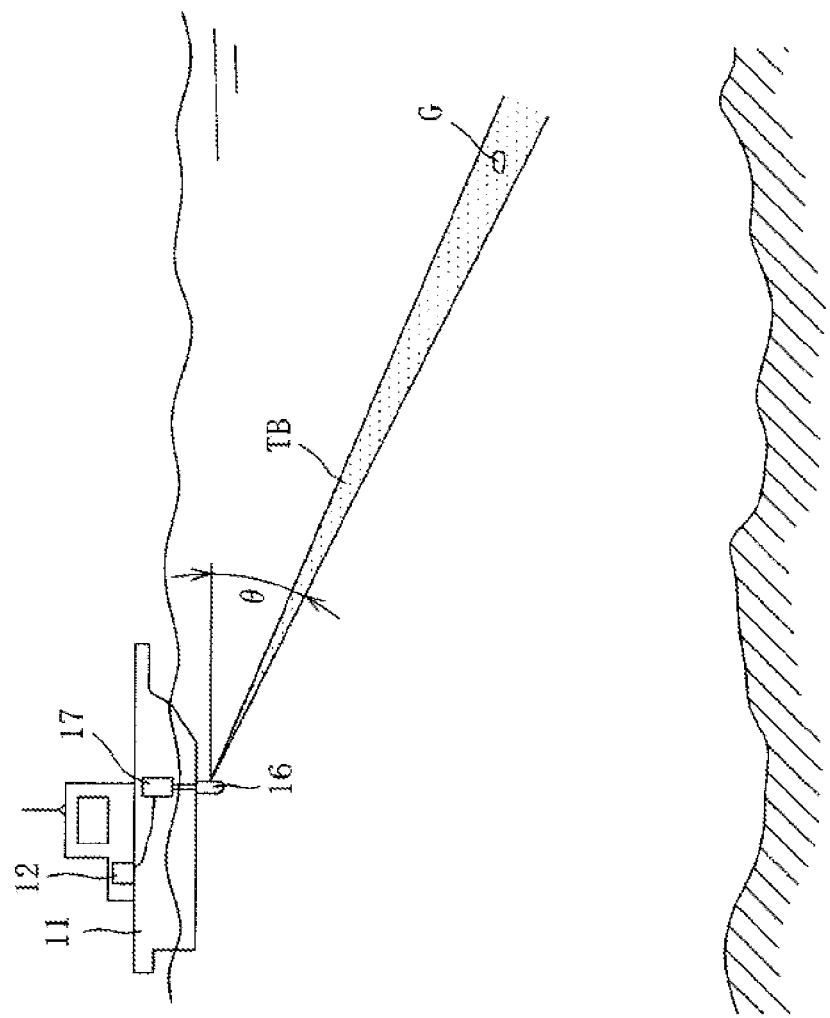
FIG. 2 is a schematic side view illustrating a case where a ship with the tidal current meter measures the velocity of a tidal current in water.
Figure 3:
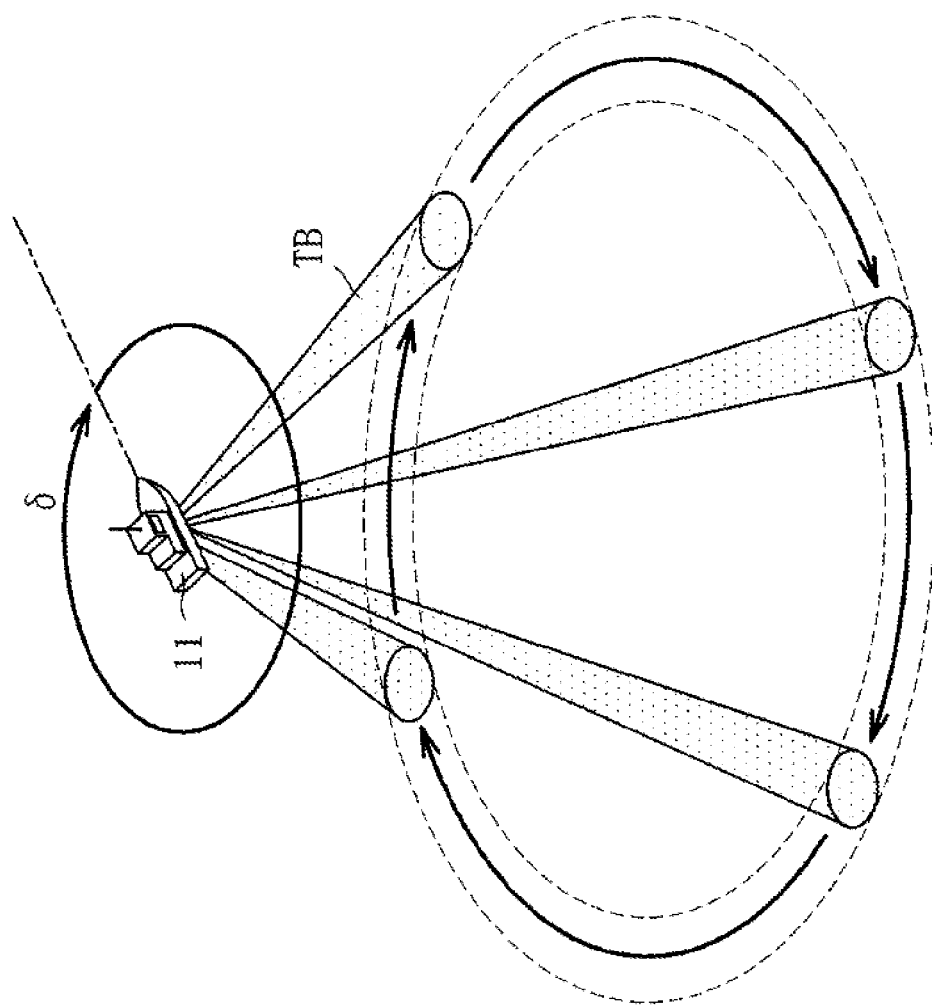
FIG. 3 is a schematic perspective view illustrating a case where a ship with the tidal current meter measures the velocity of a tidal current.

Embodiments of the present invention will now be described with reference to the accompanying drawings. First of all, a tidal current meter 12 according to a first embodiment of the present invention will be outlined with reference to FIGS. 1 to 3. FIG. 1 is a schematic diagram illustrating an outline configuration of the tidal current meter 12. FIG. 2 is a schematic side view illustrating how the velocity of a tidal current in water is measured by a ship 11 on which the tidal current meter 12 is mounted. FIG. 3 is a schematic perspective view illustrating the measurement of the velocity of the tidal current in water.

The tidal current meter 12 is mounted in a ship 11 as illustrated in FIGS. 1 to 3 to measure the velocity (speed and direction) of a tidal current around the ship 11 at a user-selected depth of water. The tidal current meter 12 is configured to accurately measure the velocity of a tidal current not only at a deep place but also at a shallow place. The tidal current meter 12 is capable of measuring the velocity of not only a tidal current in the ocean but also the current of water, for example, in a lake, a pond, or a river.

The tidal current meter 12 includes a main body 13, an operating button 14 attached to the main body 13, a display device 15 integral with the main body 13, a wave transmission/reception unit 16 having an oscillator 31 (see FIG. 4) for transmitting and receiving an ultrasonic beam TB, and an elevation device 17 for lifting or lowering the wave transmission/reception unit 16. The main body 13, the operating button 14, and the display device 15 are disposed in a pilothouse of the ship 11. The wave transmission/reception unit 16 and the elevation device 17 are disposed in the bottom of the ship 11.

The operating button 14 can be operated by a user to define various settings for the tidal current meter 12. For example, the user uses the operating button 14 to set a target depth for tidal current measurement (hereinafter referred to as the analysis depth). In the present embodiment, analysis depths of 10 m, 20 m, 30 m, 40 m, 50 m, 60 m, 70 m, 80 m, 90 m, and 100 m are selectable with the operating button 14. A plurality of analysis depths can be selected. When a plurality of analysis depths are selected, the velocity of a tidal current is measured at each of the selected analysis depths.

The wave transmission/reception unit 16 can be lifted and lowered by the elevation device 17 to emerge from the bottom of the ship 11 into water. When the velocity of a tidal current at a selected analysis depth is to be measured, the tidal current meter 12 drives the elevation device 17 to project the wave transmission/reception unit 16 from the bottom of the ship 11 and let the wave transmission/reception unit 16 transmit (radiate) a thin ultrasonic beam TB. The tidal current meter 12 uses the wave transmission/reception unit 16 to receive the ultrasonic beam TB reflected from plankton or other clutter G existing at a depth close to the analysis depth.

The wave transmission/reception unit 16 is formed of an all-around sonar and capable of changing the azimuth angle δ (scan angle, see FIG. 3) and depression angle δ (tilt angle, see FIG. 2) of the ultrasonic beam TB transmitted and received by the wave transmission/reception unit 16.

The azimuth angle δ (scan angle) is an angle representing the transmission/reception direction of the ultrasonic beam TB when a water surface on which the ship 11 is floating is viewed from above. When the water surface is viewed from above, the azimuth angle δ in the present embodiment is defined to be 0 degrees in a situation where the ultrasonic beam TB is transmitted and received in the forward direction of the ship 11 (in a direction in which the ship 11 advances). Further, it is defined so that the azimuth angle δ increases when the transmission/reception direction of the ultrasonic beam TB changes clockwise around the ship 11.

The depression angle θ (tilt angle) is an angle formed by the transmission/reception direction of the ultrasonic beam TB and the water surface (horizontal plane) on which the ship 11 is floating. The depression angle θ is defined to be 0 degrees in a situation where the ultrasonic beam TB is transmitted and received in parallel with the water surface (horizontal plane). Further, it is defined so that the depression angle δ increases when the transmission/reception direction of the ultrasonic beam TB deviates from the water surface (horizontal plane) and tilts toward a direction perpendicular to the water surface.

When the velocity of a tidal current at an analysis depth is to be measured, the tidal current meter 12 drives the wave transmission/reception unit 16, automatically selects an appropriate depression angle θ of the ultrasonic beam TB for the analysis depth, and transmits the ultrasonic beam TB in four orthogonal directions by changing the azimuth angle δ, for example, to 0 degrees, 90 degrees, 180 degrees, and 270 degrees as illustrated in FIG. 3. The method of determining the depression angle θ of the ultrasonic beam TB will be described later with reference to FIGS. 6A and 6B.

The tidal current meter 12 uses the wave transmission/reception unit 16 to receive waves reflected from clutter G existing near an analysis depth in response to ultrasonic beams TB transmitted in various directions, and calculates the velocity of a tidal current at the analysis depth in accordance with the Doppler shift frequency of each reflected wave. As the velocity of the tidal current is calculated in accordance with the Doppler shift frequencies of the ultrasonic beams TB transmitted and received in a plurality of different directions (four directions in the present embodiment), the speed and direction (vector) of the tidal current can be determined. When the velocity of the tidal current at the analysis depth selected by the operating button 12 is calculated in the above manner, the calculated velocity and other relevant information (for example, the analysis depth, the speed of the ship 11, the depth of water beneath the ship 11, and the temperature of water) are displayed together on the display device 15 and presented to the user.

Figure 4:
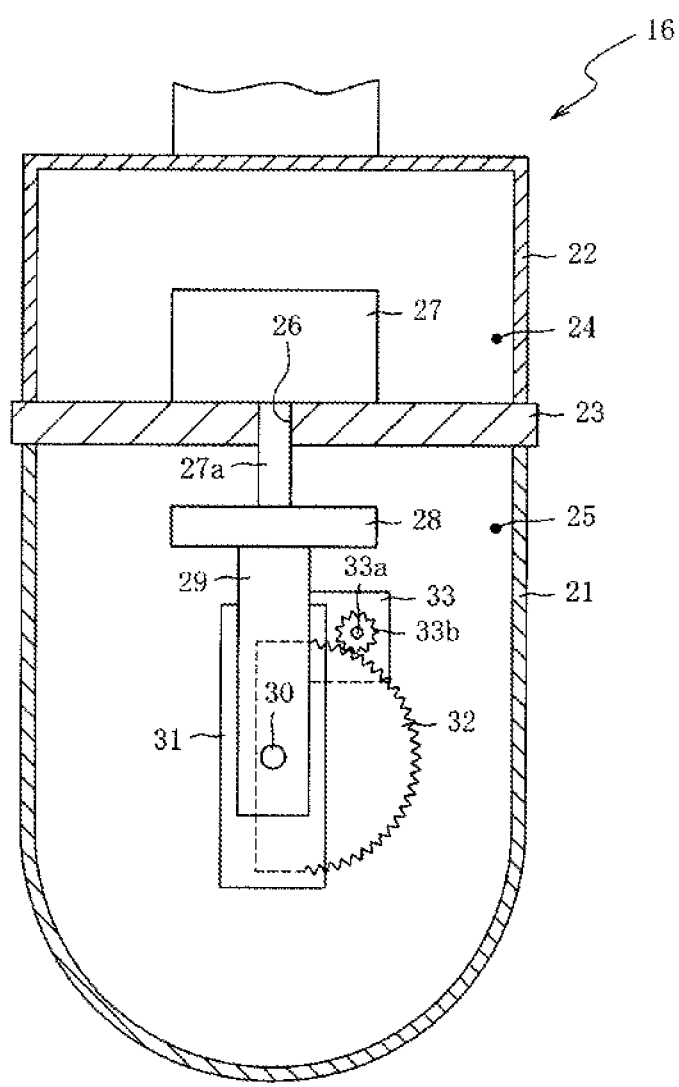
FIG. 4 is a schematic cross-sectional view illustrating a wave transmission/reception unit.

A configuration of the wave transmission/reception unit 16 will now be described in detail with reference to FIG. 4. FIG. 4 is a schematic cross-sectional view illustrating the wave transmission/reception unit 16. The wave transmission/reception unit 16 includes a lower case 21, an upper case 22, and a lid 23. The lower case 21 is a bottomed cylindrical case having an open upper end and a hemispherical lower end. The upper case 22 is a lidded cylindrical case having an open lower end and a disk-shaped upper end. The lid 23 is disk-shaped to close the open lower end of the upper case 22 and the open upper end of the lower case 21. An upper housing space 24 is formed by the upper case 22 and the upper surface of the lid 23. A lower housing space 25 is formed by the lower case 21 and the lower surface of the lid 23.

A through-hole 26 is formed in the center of the lid 23. A scan motor 27 formed of a stepping motor is fastened to the upper surface of the center of the lid 23. An output shaft 27a of the scan motor 27 is rotatably inserted into the through-hole 26 and extended directly downward from the lower surface of the scan motor 27. The leading end (lower end) of the output shaft 27a is extended until it reaches an upper portion of the lower housing space 25.

A disk-shaped support plate 28 is disposed on the leading end of the output shaft 27a. The upper surface of the center of the support plate 28 is connected to the leading end of the output shaft 27a. A substantially inverted U-shaped support frame 29 is disposed on the lower surface of the support plate 28. A horizontally extended rotary shaft 30 is rotatably disposed between the lower ends of the support frame 29.

An oscillator 31 is fastened to the center of the rotary shaft 30. The oscillator 31 is capable of transmitting a thin ultrasonic beam TB in one direction and receiving its reflection. A substantially semicircular tilt gear 32 is fastened to a portion of the rotary shaft 30 that is adjacent to the oscillator 31. The rotary shaft 30, the oscillator 31, and the tilt gear 32 rotate integrally with each other.

A tilt motor 33 formed of a stepping motor is fastened to the upper end of the support frame 29. The tilt motor 33 includes an output shaft 33a that is extended toward the tilt gear 32. A pinion 33b is disposed on the leading end of the output shaft 33a. The pinion 33b meshes with the tilt gear 32.

When the scan motor 27 is driven, the output shaft 27a rotates. This causes the support plate 28, the support frame 29, and the rotary shaft 30 to integrally rotate around the output shaft 27a. The oscillator 31 fastened to the rotary shaft 30 then rotates around the output shaft 27a.

Consequently, the direction in which the ultrasonic beam TB is transmitted by the oscillator 31 can be changed clockwise or counterclockwise when the water surface on which the ship 11 is floating is viewed from above. In other words, driving the scan motor 27 changes the azimuth angle δ (scan angle) of the ultrasonic beam TB transmitted by the oscillator 31.

Meanwhile, when the tilt motor 33 is driven, the output shaft 33a rotates. This causes the pinion 33b to rotate. The tilt gear 32 meshing with the pinion 33b then rotates. Thus, the rotary shaft 30 to which the tilt gear 32 is fastened rotates in accordance with the rotation of the tilt gear 32. As a result, the oscillator 31 fastened to the rotary shaft 30 rotates around the rotary shaft 30.

Consequently, driving the tilt motor 33 changes the depression angle θ (tilt angle), which is the angle between the direction in which the oscillator 31 is oriented (the transmission direction of the ultrasonic beam TB transmitted from the oscillator 31) and the water surface (horizontal plane) on which the ship 11 is floating.

Figure 5:
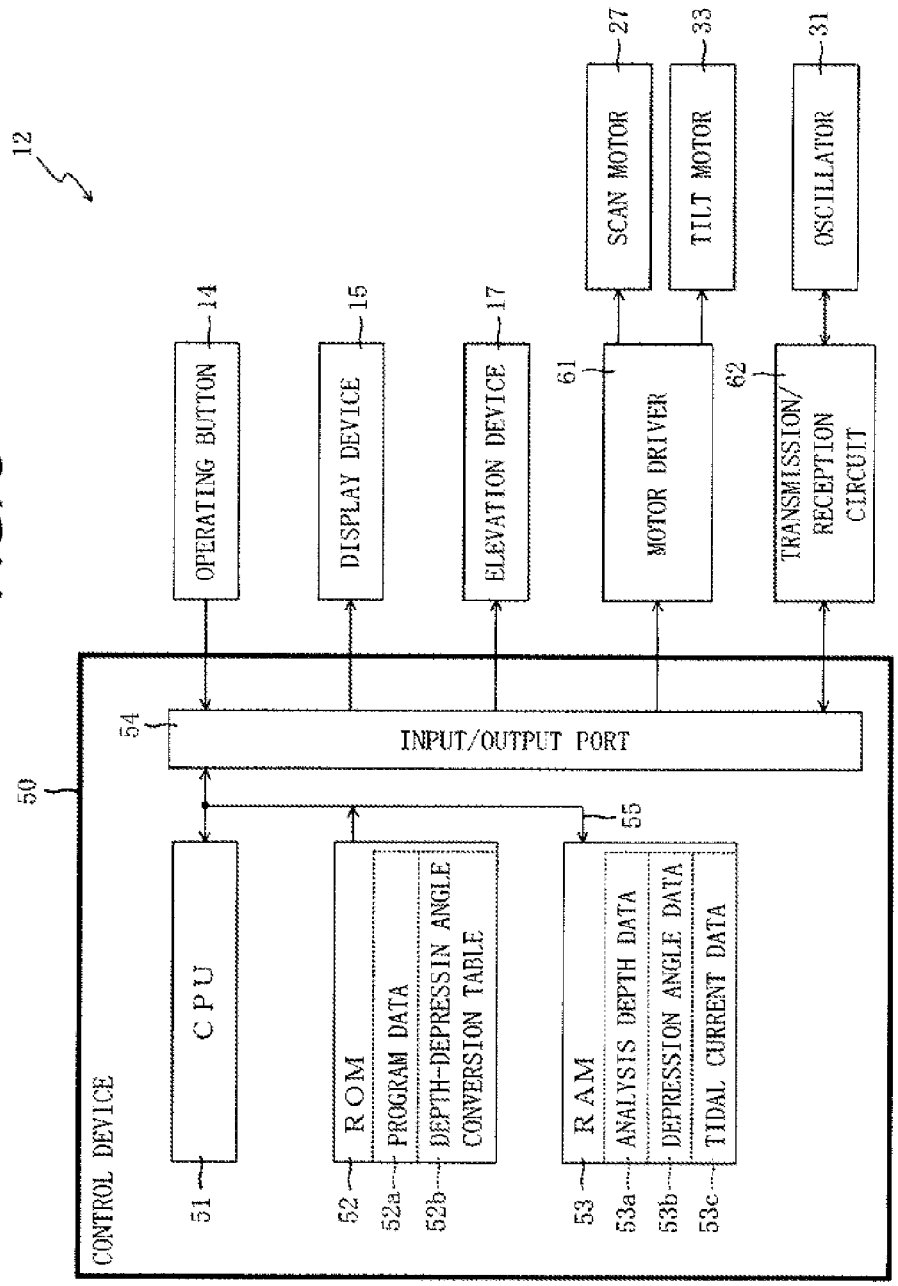
FIG. 5 is a block diagram illustrating an electrical configuration of the tidal current meter.

An electrical configuration of the tidal current meter 12 will now be described with reference to FIG. 5. FIG. 5 is a block diagram illustrating the electrical configuration of the tidal current meter 12. The main body 13 (see FIG. 1) of the tidal current meter 12 includes a control device 50. The control device 50 controls the operation of the tidal current meter 12. As illustrated in FIG. 5, the control device 50 includes a central processing unit (CPU) 51, a read-only memory (ROM) 52, and a random-access memory (RAM) 53. The CPU 51, the ROM 52, and the RAM 53 are connected to an input/output port 54 through a bus line 55.

The input/output port 54 is connected to the aforementioned operating button 14, display device 15, and elevation device 17 (see FIG. 1). Further, the aforementioned scan motor 27 and tilt motor 33 (see FIG. 4) are connected to the input/output port 54 through a motor driver 61. The oscillator 31 (see FIG. 4) is connected to the input/output port 54 through a transmission/reception circuit 62.

The CPU 51 is an arithmetic device that performs various computations to control the operation of the tidal current meter 12 in accordance with program data 52a stored in the ROM 52. The CPU 51 performs, for example, a tidal current measurement process illustrated in FIG. 7. The tidal current measurement process will be described later in detail with reference to FIG. 7.

The ROM 52 is a non-rewritable nonvolatile memory that stores, for example, fixed-value data as well as the program data 52a executed by the CPU 51. Alternatively, however, a rewritable nonvolatile memory (for example, a flash memory) may be used in place of the non-rewritable ROM.

The ROM 52 stores, for example, a depth-depression angle conversion table 52b as fixed-value data. When the velocity of a tidal current at a selected analysis depth is to be measured, the depth-depression angle conversion table 52b is used to determine the depression angle θ of the transmission/reception direction of the ultrasonic beam TB that is appropriate for the selected analysis depth. In other words, the tidal current meter 12, which includes the wave transmission/reception unit 16 formed of an all-around sonar and uses the depth-depression angle conversion table 52b, is capable of automatically changing the depression angle θ of the transmission/reception direction of the ultrasonic beam TB so that the depression angle θ is appropriate for an analysis depth at which the velocity of a tidal current is to be measured.

Figures 6A, 6B:
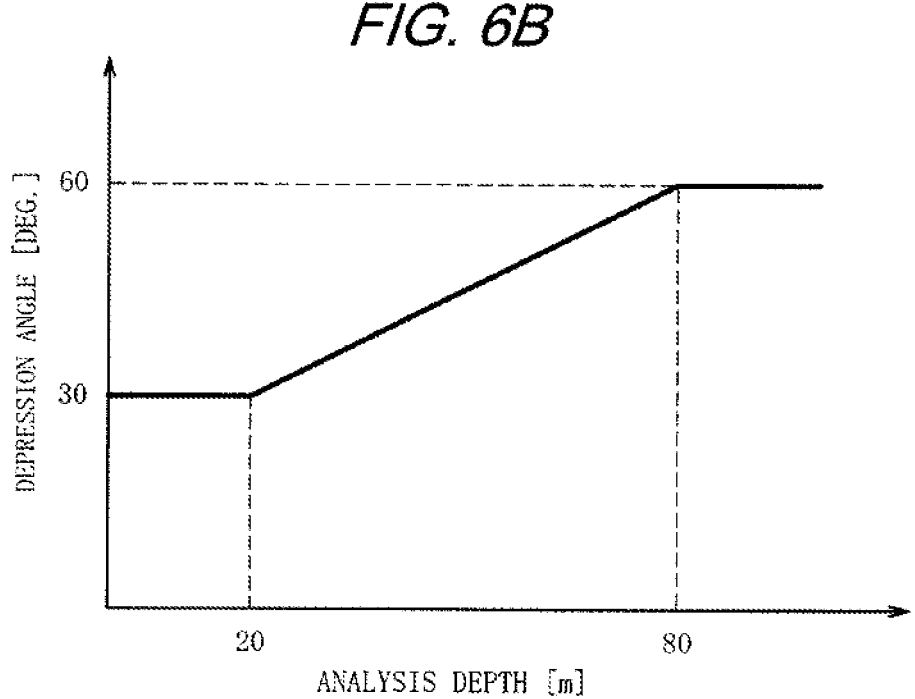
FIG. 6A is a schematic diagram illustrating the contents of a depth-depression angle conversion table stored in a ROM.
FIG. 6B is a graph illustrating the relationship between an analysis depth and a depression angle derived from the depth-depression angle conversion table.

The depth-depression angle conversion table 52b will now be described in detail with reference to FIGS. 6A and 6B. FIG. 6A is a schematic diagram illustrating the contents of the depth-depression angle conversion table. FIG. 6B is a graph illustrating the relationship between the analysis depth and the depression angle θ derived from the depth-depression angle conversion table 52b.

As illustrated in FIG. 6A, a depression angle θ of 30 degrees is associated with an analysis depth of 10 m, a depression angle θ of 30 degrees is associated with an analysis depth of 20 m, a depression angle θ of 35 degrees is associated with an analysis depth of 30 m, a depression angle θ of 40 degrees is associated with an analysis depth of 40 m, a depression angle θ of 45 degrees is associated with an analysis depth of 50 m, a depression angle θ of 50 degrees is associated with an analysis depth of 60 m, a depression angle θ of 55 degrees is associated with an analysis depth of 70 m, a depression angle θ of 60 degrees is associated with an analysis depth of 80 m, a depression angle θ of 60 degrees is associated with an analysis depth of 90 m, and a depression angle θ of 60 degrees is associated with an analysis depth of 100 m.

More specifically, if the user selects an analysis depth of 10 m or 20 m, a depression angle θ of 30 degrees is set for the ultrasonic beam TB as illustrated in FIG. 6B. In other words, an angle of 30 degrees is set as the lower-limit depression angle θ for the ultrasonic beam TB.

If the depression angle θ of the ultrasonic beam TB is set to be close to 0 degrees, the ultrasonic beam TB might be reflected from water waves generated on the surface of water. Thus, the beam reflected from the surface of a water wave might be received by the wave transmission/reception unit 16, the ultrasonic beam TB might fail to reach clutter G, or the beam reflected from clutter G might fail to reach the wave transmission/reception unit 16. In such an instance, the velocity of a tidal current might not properly be measured. However, the tidal current meter 12 is configured so as to set a depression angle θ of 30 degrees or larger for the ultrasonic beam TB. This enables the tidal current meter 12 to avoid the above-mentioned problem and properly measure the velocity of a tidal current.

Further, when the user selects an analysis depth of 80 m, 90 m, or 100 m, a depression angle θ of 60 degrees is set for the ultrasonic beam TB. In other words, an angle of 60 degrees is set as the upper-limit, depression angle θ for the ultrasonic beam TB.

If the depression angle θ of the ultrasonic beam TB is set to be close to 90 degrees, virtually no Doppler shift is caused by a beam reflected from clutter G that is moved by a tidal current substantially parallel to the water surface. Thus, the velocity of the tidal current cannot be measured. Further, if the depression angle θ of the ultrasonic beam TB is set to be close to 90 degrees, the ultrasonic beam TB reaches an ocean floor by traveling shorter distance than when the ultrasonic beam TB is transmitted at a different depression angle. It signifies that a beam reflected from clutter G at a deep place might be lost due to the influence exerted on the reflected beam by side lobes of the ultrasonic beam TB. This might result in the failure to measure the velocity of a tidal current at a deep place. However, the tidal current meter 12 is configured so as to set a depression angle θ of 60 degrees or smaller for the ultrasonic beam TB. This enables the tidal current meter 12 to avoid the above-mentioned problem and properly measure the velocity of a tidal current.

Further, the present embodiment is configured as illustrated in FIG. 6B so that a large depression angle θ is set for the ultrasonic beam TB in order to transmit the ultrasonic beam TB to a deep place when the analysis depth is great, and that a small depression angle θ is set for the ultrasonic beam TB when the analysis depth is small. Effects produced by such setup will be described later with reference to FIGS. 8A and 8B.

Returning to FIG. 5, the RAM 53 is a rewritable volatile memory and used to temporarily store various data when the CPU 51 executes a program. The RAM 53 stores at least analysis depth data 53a, depression angle data 53b, and tidal current data 53c.

The analysis depth data 53a is related to analysis depths set by the user. When, for instance, the user sets analysis depths of 20 m, 40 m, 60 m, and 80 m, data indicative of analysis depth settings of 20 m, 40 m, 60 m, and 80 m are stored in the RAM 53 as the analysis depth data 53a. The CPU 51 performs a tidal current velocity measurement process on an analysis depth indicated by the analysis depth data 53a.

Immediately after the tidal current meter 12 is turned on, data indicative of predetermined analysis depths (for example, data indicative of analysis depths of 10 m, 20 m, 30 m, and 40 m) are stored in the RAM 53 as initial values of the analysis depth data 53a. Therefore, if the user does not perform analysis depth setup, the velocity of a tidal current will be measured at analysis depths indicated by the initial values.

When the tidal current meter 12 is turned off, the values of the analysis depth data 53a may be stored, for instance, in a separately provided flash memory so that the values stored, for instance, in the flash memory will be stored in the RAM 53 as the analysis depth data 53a when the tidal current meter 12 is turned back on. Consequently, even if the tidal current meter 12 is turned off, the analysis depths previously set by the user are directly set as the analysis depth data 53a. This saves the bother of resetting the previously set analysis depths.

The depression angle data 53b indicates the depression angle θ of the ultrasonic beam TB that is set to measure the velocity of a tidal current at an analysis depth. When the velocity of a tidal current at one of the analysis depths indicated by the analysis depth data 53a is to be measured, the depth-depression angle conversion table 52b determines the depression angle θ of the ultrasonic beam TB that is appropriate for the analysis depth. Data indicative of the determined depression angle θ is then stored in the RAM 53 as the depression angle data 53b.

The CPU 51 exercises control to drive the tilt motor 33 for the wave transmission/reception unit 16 in such a manner as to transmit and receive the ultrasonic beam TB at a depression angle θ indicated by the depression angle data 53b. This causes the wave transmission/reception unit 16 to transmit and receive the ultrasonic beam TB at a depression angle θ indicated by the depression angle data 53b.

The tidal current data 53c indicates the measured velocity of a tidal current. The CPU 51 keeps the depression angle θ at a value θ indicated by the depression angle data 53b, transmits and receives the ultrasonic beam TB in four directions by sequentially changing the azimuth angle δ from α degrees through 90+α degrees and 180+α degrees to 270+α degrees, and calculates the velocity of a tidal current in accordance with the Doppler shift frequency of a reflected wave received in each direction. Here, the value α is an arbitrary value smaller than 90 (the same holds true hereinafter). Data indicative of the measured velocity of a tidal current is stored in the RAM 53 as the tidal current data 53c. In accordance with the tidal current data 53c stored in the RAM 53, the CPU 51 causes the display device 15 to display the measured velocity of a tidal current.

Figure 7:
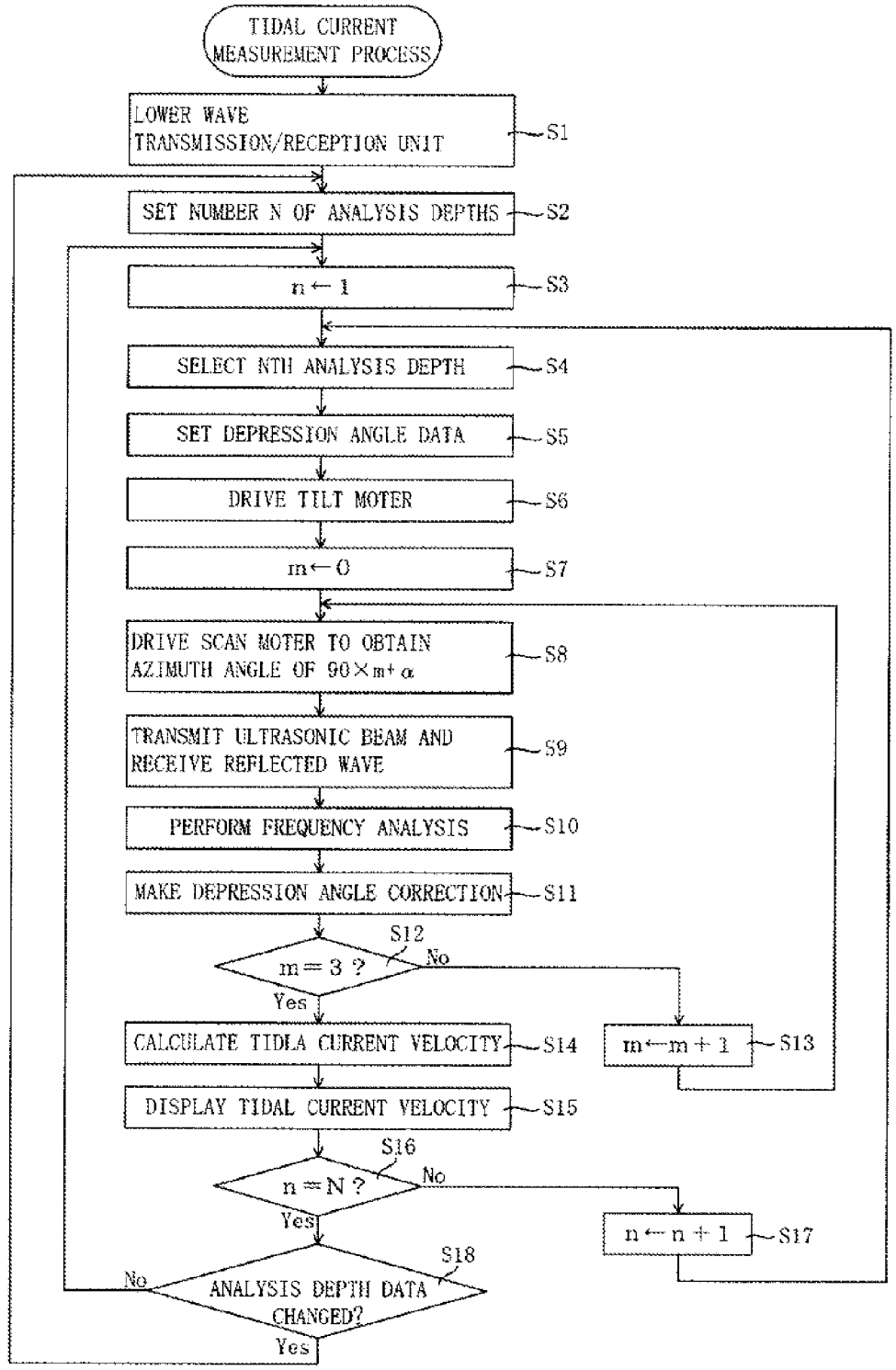
FIG. 7 is a flowchart illustrating a tidal current measurement process performed by a control device.

A tidal current measurement process performed by the control device 50 will now be described in detail with reference to FIG. 7. FIG. 7 is a flowchart illustrating the tidal current measurement process. When the tidal current meter 12 is turned on or when the measurement of the velocity of a tidal current starts, the CPU 51 begins to perform the tidal current measurement process. The tidal current measurement process is repeatedly performed until the tidal current meter 12 is turned off or the user terminates the measurement of the velocity of a tidal current by using, for example, the operating button 14.

The tidal current measurement process begins by driving the elevation device 17 to lower the wave transmission/reception unit 16 (step S1). The wave transmission/reception unit 16 then projects from the bottom of the ship 11 into water. This enables the oscillator 31 to transmit and receive the ultrasonic beam TB.

Next, the number of analysis depths indicated by the analysis depth data 53b (the total number of target depths for tidal current velocity measurement) N is set (step S2). As mentioned earlier, the tidal current meter 12 permits the user to set a plurality of analysis depths targeted for tidal current velocity measurement. In step S2, the number N of analysis depths set by the user is set. When, for instance, analysis depths of 20 m, 40 m, and 60 m are set by the user, the number "3" is set in step S2 as the number N of analysis depths.

If analysis depth setup is not performed by the user, the number of predetermined analysis depths that are set as initial values is set in step S2 as the number N. Data indicative of the predetermined analysis depths, which is included in the analysis depth data 53b, is set upon power-on as the initial values. If, for instance, the values 10 m, 20 m, 30 m, and 40 m are set as the initial values of the analysis depth data 53b, the number "4" is set as the number N of analysis depths.

Next, an area for a variable n is allocated in the RAM 53, and the value 1 is substituted for the variable n (step S3). The variable n is prepared for sequentially measuring the velocity of a tidal current at all analysis depths indicated by the analysis depth data 53b.

Next, the nth analysis depth among one or more analysis depths indicated by the analysis depth data 53b is set in order from the shallowest to the deepest (step S4). In step S4, the nth analysis depth is set in order from the shallowest to the deepest. Alternatively, however, the nth analysis depth may be set in order from the deepest to the shallowest. Another alternative is to set analysis depths in the order indicated by the analysis depth data 53b.

Next, the depth-depression angle conversion table 52b is used to determine the depression angle θ for the analysis depth set in step S4, and the depression angle data 53b indicative of the determined depression angle θ is stored in the RAM 53 (step S5). The tilt motor 33 is then driven through the motor driver 61 so as to transmit and receive the ultrasonic beam TB at the depression angle θ indicated by the depression angle data 53b (step S6). This causes the oscillator 31 to rotate around the rotary shaft 30 (see FIG. 4) so that a depression angle θ appropriate for the analysis depth determined in step S5 is set for the ultrasonic beam TB transmitted and received by the oscillator 31.

Next, an area for a variable m is allocated in the RAM 53, and the value 0 is substituted for the variable m (step S7). The variable m is prepared for transmitting and receiving the ultrasonic beam TB at four azimuth angles δ when the velocity of at tidal current at the analysis depth set in step S4 is to be measured.

Next, the scan motor 27 is driven through the motor driver 61 so as to transmit and receive the ultrasonic beam TB at an azimuth angle δ of 90×m+α (step S8). This causes the oscillator 31 to rotate around the output shaft 27a (see FIG. 4) so that an azimuth angle δ of 90×m+α is set for the ultrasonic beam TB transmitted and received by the oscillator 31.

Next, the oscillator 31 transmits the ultrasonic beam TB through the transmission/reception circuit 62, and then receives its reflection from clutter G at the analysis depth set in step S4 (step S9). Subsequently, frequency analysis is performed in accordance with a signal received due to the reception of the reflection, and the Doppler shift frequency is calculated to calculate the velocity v of a tidal current at the analysis depth (step S10). The velocity v of the tidal current that is calculated in step S10 is calculated as a result of the transmission and reception of the ultrasonic beam TB having the depression angle θ set in steps S5 and S6, and the azimuth angle δ set in step S8. The calculated velocity v of the tidal current is a component indicated by a direction defined by the depression angle θ and the azimuth angle δ.

Consequently, in step S11, which follows step 10, the velocity of a tidal current that flows in parallel with the water surface (horizontal plane) is determined. More specifically. Equation (1) below is used to make a depression angle correction on the velocity v of the tidal current, which was calculated in step S10, in order to calculate a direction component v' of the velocity of the tidal current that is indicated by a depression angle of 0 degrees (horizontal direction) and the azimuth angle δ (step S11). The velocity v' of the tidal current that is calculated in step S11 is temporarily stored in the RAM 53.

$$v'=v/\cos\theta \tag{1}$$

Next, a check is performed to determine whether or not the variable m is 3 (step S12). If the variable m is not 3 (the query in step S12 is answered "No"), the value 1 is added to the variable m (step S13). Upon completion of step S13, processing returns to step S8. Subsequently, steps S8 to S12 are repeated until the variable m is 3. Consequently, when the velocity of a tidal current at the analysis depth set in step S4 is to be measured, the ultrasonic beam TB is transmitted and received while the depression angle θ set in steps S5 and S6 in accordance with the analysis depth is maintained for the ultrasonic beam TB and the azimuth angle δ is sequentially changed from α degrees through 90+α degrees and 180+α degrees to 270+α degrees.

The velocity components v' of the tidal current in the four directions indicated by a depression angle of 0 degrees and azimuth angles δ of α degrees, 90+α degrees, 180+α degrees, and 270+α degrees are then calculated from the Doppler shift frequencies of the reflection of the ultrasonic beam TB transmitted in the four directions.

If it is determined in step S12 that the variable m is 3 (the query in step S12 is answered "Yes"), the velocity components v' of the tidal current in the four directions indicated by a depression angle of 0 degrees and azimuth angles δ of α degrees, 90+α degrees, 180+α degrees, and 270+α degrees, which are calculated in steps S8 to S12, are vector-synthesized to calculate the velocity (speed and direction) of the tidal current at the analysis depth set in step S4, and data indicative of the calculated velocity of the tidal current is stored in the RAM 53 as the tidal current data 53c (step S14).

Subsequently, the display device 15 displays the velocity of the tidal current, which is indicated by the tidal current data 53c stored in the RAM 53 in step S14, as the velocity of the tidal current at the analysis depth set in step S4 (step S15).

Next, a check is performed to determine whether or not the variable n is equal to the number N of analysis depths set in step S2 (step S16). If it is determined in step S16 that the variable n is not equal to the number N of analysis depths (the query in step S16 is answered "No"), the value 1 is added to the variable n (step S17). Upon completion of step S17, processing returns to step S4. Steps S4 to S16 are then repeated until the variable n is equal to the number N of analysis depths. This ensures that the velocity of the tidal current is measured at all target analysis depths for tidal current velocity measurement, which are indicated by the analysis depth data 53a. The measured velocity of the tidal current at each analysis depth targeted for measurement is then displayed on the display device 15.

If, by contrast, it is determined in step S16 that the variable n is equal to the number N of analysis depths (the query in step S16 is answered "Yes"), a check is performed to determine whether or not the analysis depth data 53a is changed (step S18). If it is determined in step S18 that the analysis depth data 53*a* is not changed (the query in step S18 is answered "No"), processing returns to step S3 and the velocity of the tidal current at all analysis depths indicated by the analysis depth data 53*a* is measured again. If, by contrast, it is determined in step S18 that the analysis depth data 53*a* is changed (the query in step S18 is answered "Yes"), processing returns to step S2 and the velocity of the tidal current at all newly set analysis depths is measured in accordance with the changed analysis depth data 53*a*.

Figure 8A:
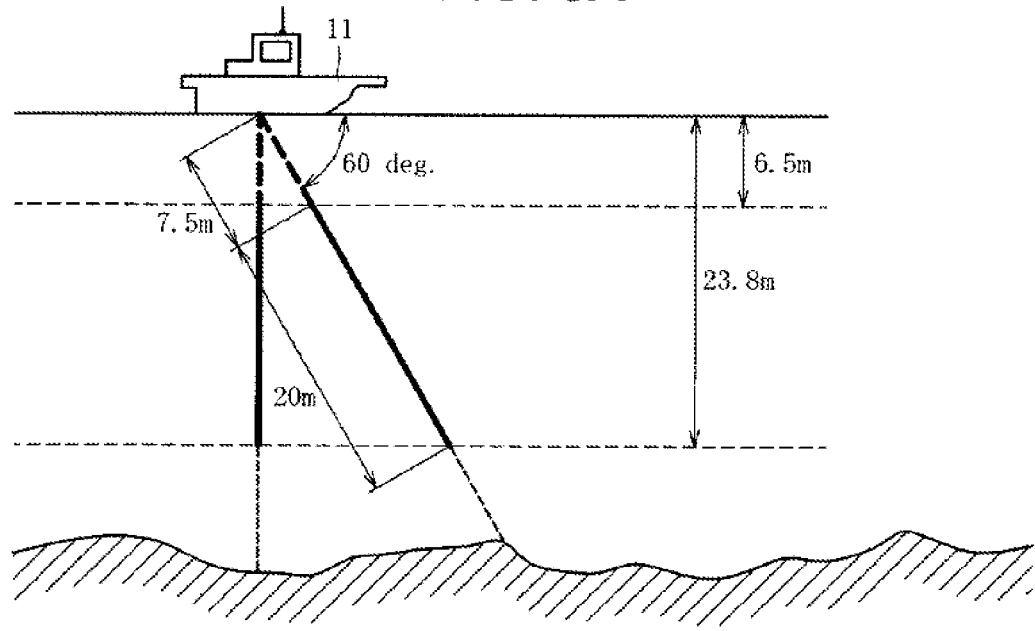
FIG. 8A is a schematic diagram illustrating the status of an ultrasonic beam that is transmitted and received at a depression angle of 60 degrees by a ship with the tidal current meter.
Figure 8B:
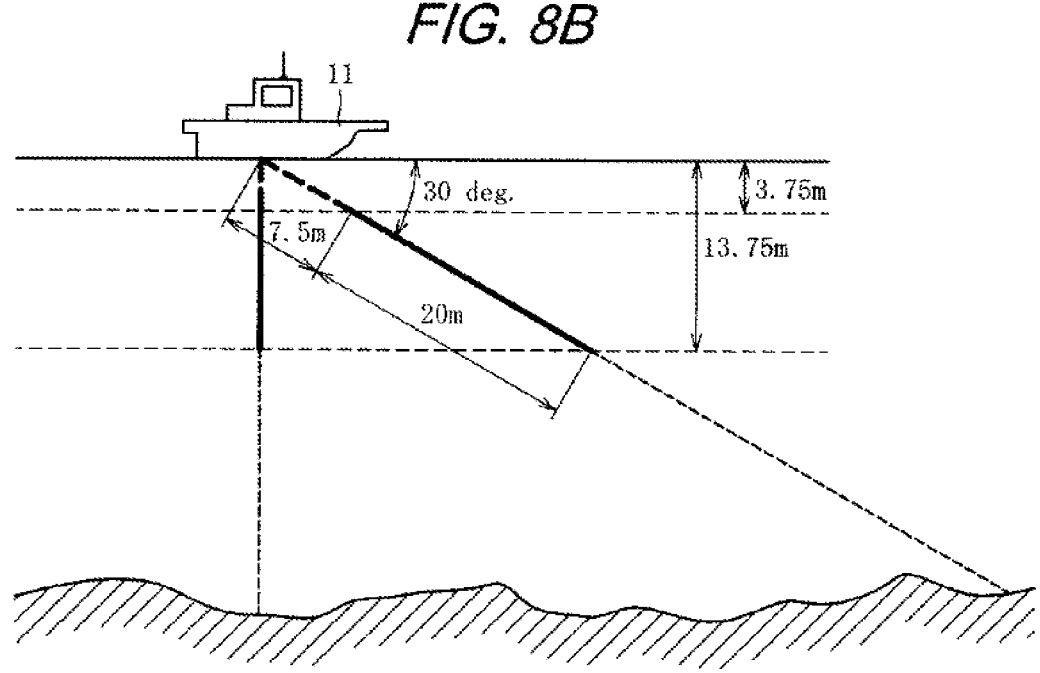
FIG. 8B is a schematic diagram illustrating the status of an ultrasonic beam that is transmitted at a depression angle of 30 degrees from the ship with the tidal current meter.

Effects produced by the tidal current meter 12 according to the present embodiment will now be described with reference to FIGS. 8A and 8B. FIG. 8A is a schematic diagram illustrating the status of the ultrasonic beam TB that is transmitted and received at a depression angle θ of 60 degrees by the ship 11 with the tidal current meter 12. FIG. 8B is a schematic diagram illustrating the status of the ultrasonic beam TB that is transmitted at a depression angle θ of 30 degrees from the ship 11 with the tidal current meter 12.

As mentioned earlier, when the velocity of a tidal current is to be measured at a great analysis depth, the tidal current meter 12 sets a large depression angle θ for the ultrasonic beam TB so that the ultrasonic beam TB reaches a deep place. When, by contrast, the velocity of a tidal current is to be measured at a small analysis depth, the tidal current meter 12 sets a small depression angle θ for the ultrasonic beam TB.

Here, a great pulse width is generally set for the ultrasonic beam TB in order to increase the Q value of the ultrasonic beam TB. For example, a pulse width of 5 ms is set for the ultrasonic beam TB. In this instance, as the speed of sound in water is 1500 m/sec, the length of a sound post of the ultrasonic beam TB in water is 1500 m/sec×5 ms=7.5 m. In other words, the Doppler shift frequency cannot accurately be measured from a wave reflected from clutter G that is within a range of 7.5 m in the transmission/reception direction of the ultrasonic beam TB from the wave transmission/reception unit 16 projected from the bottom of the ship 11 (from substantially the water surface). Therefore, the velocity of a tidal current cannot be measured within such a range.

Further, in order to accurately calculate the Doppler shift frequency, it is necessary to prepare a large number of data for frequency analysis. Thus, a great frequency analysis width is generally used. For example, a wave reflected from clutter G within a range of 20 m in the transmission/reception direction of the ultrasonic beam TB is used for frequency analysis. Therefore, the shallowest area where frequency analysis can be performed is within a range of 7.5 m to 27.5 m in the transmission/reception direction of the ultrasonic beam TB. Consequently, the smallest analysis depth at which the velocity of a tidal current can be measured is 27.5 m in the transmission/reception direction of the ultrasonic beam TB.

Conventional tidal current meters use a fixed depression angle θ for the ultrasonic beam TB without regard to the analysis depth. A depression angle θ of approximately 60 degrees is used in order to measure the velocity of a tidal current at a deep place. If, in such an instance, the pulse width of the ultrasonic beam TB is set to 5 ms with a frequency analysis width of 20 m selected, the shallowest area where frequency analysis can be performed is within a range of 7.5 m×sin 60° to 27.5 m×sin 60°, that is, within a range of 6.5 m to 23.8 m as illustrated in FIG. 8A.

Consequently, if the pulse width of the ultrasonic beam TB is set to be as great as 5 ms and the frequency analysis width is set to be as great as 20 m, the velocity of a tidal current at a depth as shallow as 10 m might not be properly measured. If, by contrast, the velocity of a tidal current at a depth as shallow as 10 m is to be measured while a depression angle θ of 60 degrees is persistently used for the ultrasonic beam TB, it is necessary to reduce the pulse width of the ultrasonic beam TB or reduce the frequency analysis width. It signifies that accurate measurement results will not be obtained.

Meanwhile, the tidal current meter 12 is capable of changing the depression angle θ of the ultrasonic beam TB in accordance with the analysis depth. When the velocity of a tidal current at a depth as shallow as 10 m is to be measured, a depression angle θ of 30 degrees is set for the ultrasonic beam TB. Even if the pulse width of the ultrasonic beam TB is set to 5 ms with a frequency analysis width of 20 m selected in a situation where a depression angle θ of 30 degrees is set for the ultrasonic beam TB, the shallowest area where frequency analysis can be performed is within a range of 7.5 m×sin 30° to 27.5 m×sin 30°, that is, within a range of 3.75 m to 13.75 m as illustrated in FIG. 8B.

In other words, when the velocity of a tidal current at a shallow place is to be measured, setting a small depression angle θ for the ultrasonic beam TB increases the time interval between the instant at which the oscillator 31 transmits the ultrasonic beam TB and the instant at which a wave reflected from clutter G at the shallow place reaches the oscillator 31. Therefore, the velocity of a tidal current at a shallow place can be measured without reducing the pulse width of the ultrasonic beam TB or reducing the frequency analysis width.

Further, when a small depression angle θ is set for the ultrasonic beam TB in a situation where the analysis depth is small, the tidal current meter 12 is capable of increasing the velocity resolution of tidal current measurement as described below. If, for example, the frequency fc of the oscillator 31 is 400 kHz, the wavelength λ in water is as indicated below because the speed c of sound in water 1500 m/sec:

$$\lambda = c/fc = 1500/(400 \times 10^3) = 3.75 \times 10^{-3} \text{ [m]}$$

Here, when frequency analysis is performed by using an analog-to-digital converter having a sampling frequency fs of 74609 Hz and using 2048 sampling points N for frequency analysis, the frequency resolution fd is as follows:

$$fd = fs/N = 74609/2048 = 36.4 \text{ [Hz]}$$

Thus, the velocity resolution vd is as follows when the motion of the ship 11 is ignored:

$$vd = (\lambda/2)fd = (3.75 \times 10^{-3}/2) \times 36.4 = 0.068 \text{ [m/s]}$$

The velocity resolution vd is the resolution of a velocity component of the transmission/reception direction (the direction defined by the depression angle θ and the azimuth angle δ) of the ultrasonic beam TB. Thus, if the depression angle θ of the ultrasonic beam TB is 60 degrees, the velocity resolution $vd_{60'}$ at a velocity of a tidal current velocity that is subjected to the depression angle correction indicated by Equation (1) above is as follows:

$$vd_{60'}{}^* = vd/\cos 60° = 0.136 \text{ [m/s]} = 0.265 \text{ [knots]}$$

If, by contrast, the depression angle θ of the ultrasonic beam TB is 30 degrees, the velocity resolution $vd_{30'}$ at the velocity of a tidal current velocity that is subjected to the depression angle correction indicated by Equation (1) above is as follows:

$$vd_{30'} = vd/\cos 30° = 0.0785 \text{ [m/s]} = 0.153 \text{ [knots]}$$

As is obvious from above, the velocity resolution $vd_{30'}$ obtained when the depression angle θ of the ultrasonic beam TB is 30 degrees is higher than the velocity resolution $vd_{60}$, obtained when the depression angle θ of the ultrasonic beam TB is 60 degrees.

As described above, the tidal current meter 12 according to the first embodiment is configured so that the wave transmission/reception unit 16 is formed of an all-around sonar, and that the depression angle θ of the ultrasonic beam TB can be changed when it is to be transmitted and received. Therefore, the depression angle θ of the ultrasonic beam TB can be changed in accordance with the analysis depth targeted for measurement.

Consequently, when the velocity of a tidal current at a deep place is to be measured, the depression angle θ of the ultrasonic beam TB can be increased to permit the ultrasonic beam TB to reach the deep place. Further, when the velocity of a tidal current at a shallow place is to be measured, the depression angle θ of the ultrasonic beam TB can be decreased. This makes it possible to adopt a great pulse width of the ultrasonic beam TB and a great frequency analysis width required for measuring the Doppler shift frequency. As a result, a decrease in the frequency resolution can be avoided even when the velocity of a tidal current at a shallow place is measured. Further, when the depression angle θ of the ultrasonic beam TB is decreased, the velocity resolution itself can be increased. As a result, the velocity of a tidal current can be accurately measured not only at a deep place but also at a shallow place.

Further, when a target analysis depth for measuring the velocity of a tidal current is selected in step S4, the depression angle θ of the ultrasonic beam TB is automatically set as appropriate for the selected analysis depth. This makes it possible to select a depression angle θ appropriate for measuring the velocity of a tidal current at the target analysis depth for measurement and then transmit and receive the ultrasonic beam TB at the selected depression angle θ.

Furthermore, the incorporated depth-depression angle conversion table 52b defines the relationship between the user-selectable analysis depth and the depression angle θ of the ultrasonic beam TB that is appropriate for the analysis depth. Therefore, when an analysis depth is set, the depth-depression angle conversion table 52b immediately determines the depression angle θ of the ultrasonic beam TB that is appropriate for the analysis depth.

Moreover, if a selected analysis depth (for example, 10 m) is smaller than a predetermined analysis depth (for example, 30 m), the depth-depression angle conversion table 52b sets a depression angle θ (30 degrees in the current example) smaller than the depression angle θ (35 degrees in the current example) associated with the predetermined analysis depth. Thus, when the depth is small, the ultrasonic beam TB is transmitted and received at a small depression angle θ. Therefore, the velocity of a tidal current at a shallow place can be accurately measured.

Moreover, the oscillator 31 is driven in such a manner that the ultrasonic beam TB is transmitted and received at a depression angle θ selected for one analysis depth while four different azimuth angles δ are sequentially selected. The velocity of a tidal current is then calculated in accordance with the Doppler shift frequency of each reflected wave received at the four different azimuth angles δ. When the velocity of a tidal current is to be measured to determine its speed and direction (vector), the ultrasonic beam TB needs to be transmitted and received at two or more different azimuth angles δ. In the past, at least one oscillator was prepared for each azimuth angle δ at which the ultrasonic beam TB was transmitted and received. In other words, when, for instance, the ultrasonic beam TB was transmitted and received at four different azimuth angles δ, at least four oscillators were prepared. Meanwhile, the tidal current meter 12 is capable of changing the azimuth angle δ of the ultrasonic beam TB with respect to one oscillator 31. Therefore, by using one oscillator 31, it is possible to set an appropriate depression angle θ for the analysis depth and transmit and receive the ultrasonic beam TB in four different azimuth angles δ. As a result, it is possible to accurately measure the velocity of a tidal current not only at a deep place but also at a shallow place.

The present embodiment has been described with reference to a case where the ultrasonic beam TB is transmitted and received in four different azimuth angles δ. However, as mentioned earlier, in order to determine the speed and direction (vector) of a tidal current in a case where its velocity is to be measured, the ultrasonic beam TB needs to be transmitted and received at two or more different azimuth angles δ. Therefore, an alternative configuration may be employed so as to drive the oscillator 31 while changing the azimuth angle δ for the purpose of transmitting and receiving the ultrasonic beam TB at two or more azimuth angles δ. When such an alternative configuration is employed, the use of one oscillator 31 makes it possible to accurately measure the velocity of a tidal current not only at a deep place but also at a shallow place by transmitting and receiving the ultrasonic beam TB in two or more azimuth angles δ with an appropriate depression angle θ selected for the analysis depth.

The tidal current meter 12 according to a second embodiment of the present invention will now be described. For the tidal current meter 12 according to the first embodiment, the depth-depression angle conversion table 52b is prepared. When an analysis depth is selected, the tidal current meter 12 according to the first embodiment uses its depth-depression angle conversion table 52b to determine the depression angle θ of the ultrasonic beam TB that is appropriate for the selected analysis depth. Meanwhile, the tidal current meter 12 according to the second embodiment does not use the depth-depression angle conversion table 52b. When an analysis depth is selected, the tidal current meter 12 according to the second embodiment performs calculations in step S5 of the tidal current measurement process to determine the depression angle θ of the ultrasonic beam TB that is appropriate for the selected analysis depth. The other elements of the tidal current meter 12 and the individual steps of the tidal current measurement process are the same as those in the first embodiment and will not be redundantly described.

The tidal current meter 12 according to the second embodiment includes a depth gauge (not shown). In the tidal current measurement process performed by the CPU 11, the depth gauge measures the depth of water h directly below the ship 11.

The depth gauge need not always be attached to the tidal current meter 12. The tidal current meter 12 may alternatively be configured so as to obtain an input of the water depth h measured by an externally disposed depth gauge. Another alternative is to use the wave transmission/reception unit 16 of the tidal current meter 12 to transmit the ultrasonic beam TB in a vertical direction from the ship 11 (at a depression angle θ of 90 degrees) and receive a wave reflected from a bottom such as the ocean floor or lake bed for the purpose of measuring the water depth h directly below the ship 11.

Here, if the ultrasonic beam TB is transmitted in a vertical direction (in a direction at a depression angle θ of 90 degrees) from the ship 11, a wave reflected from clutter G is hidden by a wave reflected from the bottom to generate a dead zone where the wave reflected from the clutter G cannot be received. The length l of the dead zone is determined by the pulse width of the ultrasonic beam TB, the gate width of an FFT device (fast Fourier transform device) performing frequency analysis, and the characteristics of the oscillator 31. An appropriate invariable should be predetermined by conducting actual product tests.

A measurement range r=h−l of the ultrasonic beam TB is then defined from the water depth h and the dead zone length l. In step 5 of the tidal current measurement process, the depression angle θ is calculated from Equation (2) below and set when the selected analysis depth is d:

$$\theta = 90° - \arccos(d/r) \qquad (2)$$

Thus, automatic setup is performed so that the smaller the analysis depth d, the smaller the depression angle θ. As a result, when the velocity of a tidal current at a deep place is to be measured, a large depression angle θ can be set for the ultrasonic beam TB to ensure that the ultrasonic beam TB reaches the deep place. Further, when the velocity of a tidal current at a shallow place is to be measured, a small depression angle θ can be set for the ultrasonic beam TB.

Consequently, as described in conjunction with the first embodiment, even when the velocity of a tidal current at a shallow place is to be measured, it is possible to adopt a great pulse width of the ultrasonic beam TB and a great frequency analysis width required for measuring the Doppler shift frequency. Thus, a decrease in the frequency resolution can be avoided. In addition, the velocity resolution itself can be increased by setting a small depression angle θ for the ultrasonic beam TB. As a result, the velocity of a tidal current can be accurately measured not only at a deep place but also at a shallow place.

Moreover, if a number of analysis depths can be set in a situation where, for instance, the intervals between user-selectable analysis depths are short, the required memory capacity increases when a depression angle conversion table is used as described in conjunction with the first embodiment. However, when the depression angle θ of the ultrasonic beam TB is determined based on the analysis depth by using a calculation formula as described in conjunction with the second embodiment, it is possible to suppress an increase in the required memory capacity.

Moreover, the tidal current meter 12 according to the second embodiment produces the same effects by using the same configuration as in the first embodiment.

The tidal current meter 12 according to a third embodiment of the present invention will now be described. When an analysis depth is selected, the tidal current meter 12 according to the first, or second embodiment determines the depression angle θ of the ultrasonic beam TB in accordance with the selected analysis depth. Meanwhile, the tidal current meter 12 according to the third embodiment permits the user to set the depression angle θ of the ultrasonic beam TB. The other elements of the tidal current meter 12 and the individual steps of the tidal current, measurement, process are the same as those in the first embodiment and will not be redundantly described.

When the user operates the operating button 14, the tidal current meter 12 according to the third embodiment selects an analysis depth targeted for tidal current measurement and sets the depression angle θ of the ultrasonic beam TB for measuring at the selected analysis depth. More specifically, when the user selects an analysis depth, the display device 15 opens a screen that prompts for the input of the depression angle θ of the ultrasonic beam TB in accordance with the selected analysis depth.

In response to a prompt displayed on the screen, the user enters the depression angle θ of the ultrasonic beam TB by using the operating button 14. Data indicative of the entered depression angle θ is then stored in the RAM 53. If a plurality of analysis depths are selected, the depression angle θ of the ultrasonic beam TB can be set for each selected analysis depth. After the depression angle θ of the ultrasonic beam TB is set, the user may be allowed to change the depression angle θ by operating the operating button 14.

Further, immediately after the tidal current meter 12 is turned on, data indicating predetermined analysis depths as the initial values of the analysis depth data 53a (for example, data indicating analysis depths of 10 m, 20 m, 30 m, and 40 m) is stored in the RAM 53 and the initial values of the depression angle θ of the ultrasonic beam TB for the individual analysis depths (for example, 30 degrees, 30 degrees, 35 degrees, and 40 degrees) are set accordingly. After the initial values of the depression angle θ of the ultrasonic beam TB are set, the user may be allowed to change the initial values of the depression angle θ by operating the operating button 14.

When the tidal current meter 12 is turned off, the values of the analysis depth data 53a may be stored, for instance, in a separately provided flash memory. Further, the depression angles θ of the ultrasonic beam TB, which are set for the associated analysis depths, may be stored, for instance, in the flash memory in association with the individual analysis depths indicated by the analysis depth data 53a. When the tidal current meter 12 is subsequently turned on, the values of the analysis depth data 53a may be set in the RAM 53 in accordance with the values stored, for instance, in the flash memory. Further, data indicating the depression angles θ of the ultrasonic beam TB, which are associated with the individual analysis depths indicated by the analysis depth data 53a, may be set in the RAM 53.

Consequently, even when the tidal current meter 12 is turned off, the analysis depths previously set by the user are directly set as the analysis depth data 53a, and the depression angles θ of the ultrasonic beam TB, which are previously set by the user for the individual analysis depths, are directly set. This saves the bother of resetting the analysis depths and the depression angles θ of the ultrasonic beam TB that were previously set by the user.

When an analysis depth is selected in step S4 of the tidal current measurement process of the tidal current meter 12 according to the third embodiment, data indicating the depression angle θ of the ultrasonic beam TB that is set by the user in association with the selected analysis depth is set as the depression angle data 53b in step S5.

Consequently, the ultrasonic beam TB is transmitted and received at the user-input depression angle θ. Thus, the depression angle θ of the transmission/reception direction of the ultrasonic beam TB can be adjusted in accordance with an analysis depth at which the user wants to measure the velocity of a tidal current. Therefore, the velocity of a tidal current can be accurately measured not only at a deep place but also at a shallow place while allowing the user to adjust the depression angle θ of the ultrasonic beam TB.

Additionally, the tidal current meter 12 according to the third embodiment produces the same effects by using the same configuration as in the first and second embodiments.

The tidal current meter 12 according to a fourth embodiment of the present invention will now be described with reference to FIG. 9. The tidal current meter 12 according to the first, second, or third embodiment has been described with reference to a case where the ultrasonic beam TB is transmitted and received to measure a tidal current at each of all the selected analysis depths. Further, the description has been given on the assumption that an appropriate depression angle θ of the ultrasonic beam TB is selected for each of the selected analysis depths, and that the ultrasonic beam TB is transmitted and received at the selected depression angle θ.

Meanwhile, even when a plurality of analysis depths are selected, the tidal current meter 12 according to the fourth embodiment transmits and receives the ultrasonic beam TB at one depression angle θ and calculates the velocity of a tidal current at the plurality of analysis depths by using the reflection of the ultrasonic beam TB transmitted and received at the one depression angle θ. A depression angle θ appropriate for the greatest analysis depth is selected.

The tidal current meter 12 according to the fourth embodiment differs from the tidal current meter 12 according to the first embodiment in the tidal current measurement process performed by the control device 50. The configuration of the tidal current meter 12 according to the fourth embodiment is the same as that of the tidal current meter 12 according to the first embodiment and will not be redundantly described.

Figure 9:
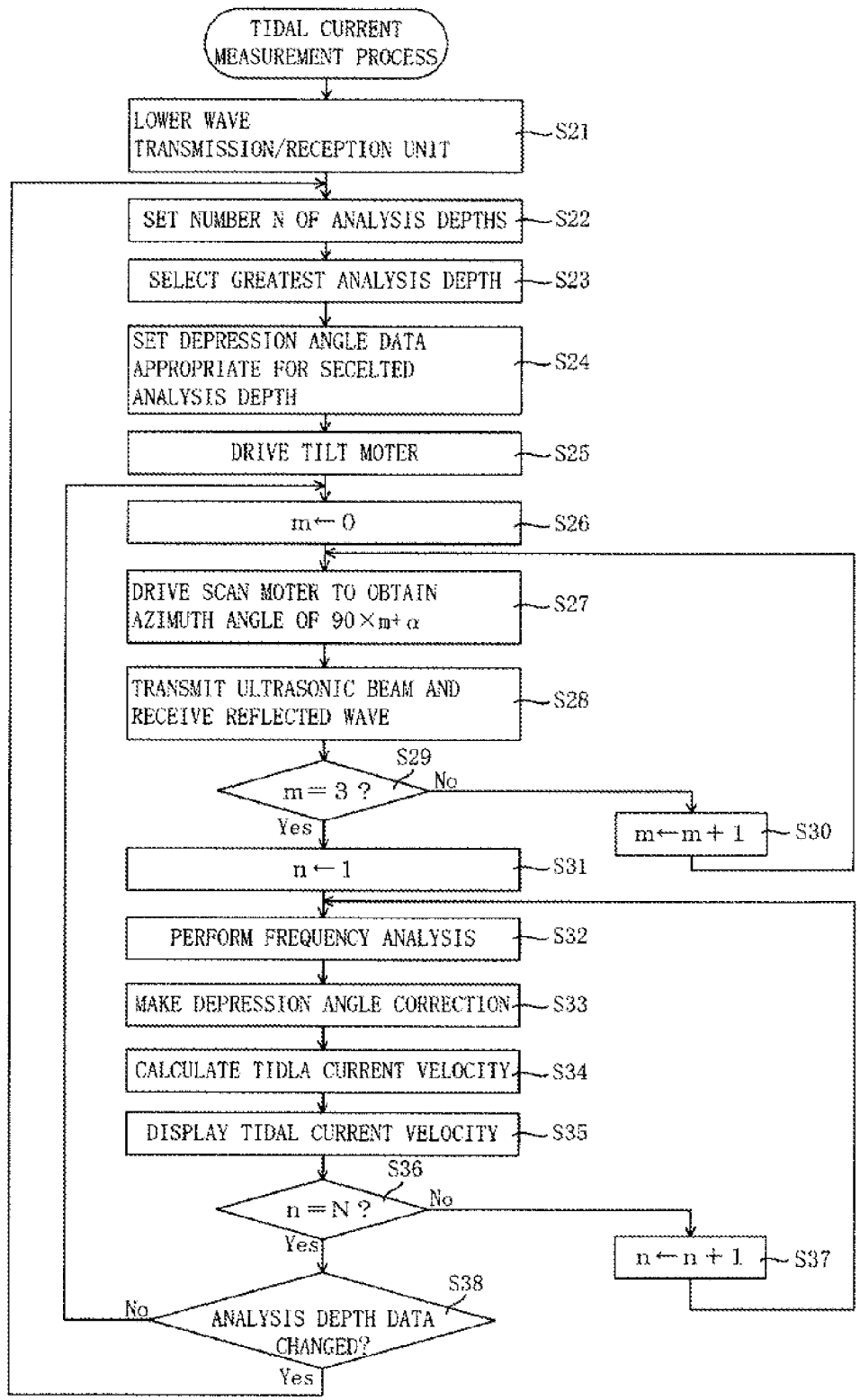
FIG. 9 is a flowchart illustrating the tidal current measurement process performed by the control device of the tidal current meter according to a fourth embodiment of the present invention.

FIG. 9 is a flowchart illustrating the tidal current measurement process performed by the control device 50 of the tidal current meter 12 according to the fourth embodiment. As is the case with the tidal current measurement process according to the first embodiment, the tidal current measurement process according to the fourth embodiment is initiated by the CPU 51 when the tidal current meter 12 is turned on or when the measurement of the velocity of a tidal current starts, and repeatedly performed until the tidal current meter 12 is turned off or the user terminates the measurement of the velocity of a tidal current by using, for example, the operating button 14.

In the tidal current measurement process according to the fourth embodiment, first of all, the elevation device 17 is driven to lower the wave transmission/reception unit 16 until it projects from the bottom of the ship 11 (step S21) into water to make the oscillator 31 ready to transmit and receive the ultrasonic beam TB.

Next, the number of analysis depths indicated by the analysis depth data 53b (the total number of target depths for tidal current velocity measurement) N is set (step S22). Next, the greatest one of one or more analysis depths indicated by the analysis depth data 53b is set (step S23). If the number of analysis depths indicated by the analysis depth data 53b is one, that is, N=1, the analysis depth indicated by the analysis depth data 53b is set in step S23.

Next, the depth-depression angle conversion table 52b is used to determine the depression angle θ for the greatest analysis depth that was set in step S23, and then the depression angle data 53b indicative of the determined depression angle θ is stored in the RAM 53 (step S24). As is the case with the tidal current meter 12 according to the second embodiment, earlier-mentioned Equation (2) may be used in step S24 to determine the depression angle θ for the greatest analysis depth.

After completion of step S24, the tilt motor 33 is driven through the motor driver 61 to transmit and receive the ultrasonic beam TB at the depression angle θ indicated by the depression angle data 53b (step S25). This enables the oscillator 31 to transmit and receive the ultrasonic beam TB at the depression angle θ appropriate for the greatest analysis depth.

Next, an area for the variable m is allocated in the RAM 53, and the value 0 is substituted for the variable m (step S26). The variable m is prepared for transmitting and receiving the ultrasonic beam TB at four azimuth angles δ when the velocity of a tidal current is to be measured. Next, the scan motor 27 is driven through the motor driver 61 so as to transmit and receive the ultrasonic beam TB at an azimuth angle δ of 90°×m+α (step S27). Next, the oscillator 31 transmits the ultrasonic beam TB through the transmission/reception circuit 62 and then receives its reflection from clutter G (step S28).

Next, a check is performed to determine whether or not the variable m is 3 (step S23). If the variable m is not 3 (the query in step S29 is answered "No"), the value 1 is added to the variable m (step S30). Upon completion of step S30, processing returns to step S27. Subsequently, steps S27 to S29 are repeated until the variable m is 3. Consequently, the ultrasonic beam TB is transmitted and received while the depression angle θ appropriate for the greatest analysis depth is maintained for the ultrasonic beam TB and the azimuth angle δ is sequentially changed from α degrees through 90+α degrees and 180+α degrees to 270+α degrees.

If, by contrast, it is determined in step S29 that the variable m is 3 (the query in step S29 is answered "Yes"), an area for the variable n is allocated in the RAM 53, and the value 1 is substituted for the variable n (step S31). The variable n is prepared for sequentially measuring the velocity of a tidal current at all analysis depths indicated by the analysis depth data 53b.

Subsequently, in steps S32 to S35, the velocity of a tidal current at the nth analysis depth indicated by the variable n is calculated. In steps S32 to S35, the velocity of a tidal current at the nth analysis depth is calculated in order from the shallowest to the deepest. However, an alternative is to calculate the velocity of a tidal current at the nth analysis depth in order from the deepest to the shallowest or calculate the velocity of a tidal current at analysis depths in the order indicated by the analysis depth data 53b.

In accordance with a signal received upon receipt of the reflections of ultrasonic beams TB that are transmitted and received in four azimuth angles δ while the depression angle θ is maintained in step S28, processing is performed in step S32 to perform frequency analysis on a wave reflected from clutter G at the nth analysis depth, calculate the Doppler shift frequency, and calculate the velocity v of a tidal current at the nth analysis depth (step S32).

The velocity v of a tidal current that is calculated on the four azimuth angles δ at which the ultrasonic beam. TB is transmitted and received is calculated in step S32 in accordance with the transmission and reception of the ultrasonic beam TB having the depression angle θ set in steps S23 and S24 and the azimuth angles δ. The calculated velocity v of the tidal current is a component indicated by a direction defined by the depression angle θ and the azimuth angle δ.

In order to determine the velocity of a tidal current that flows in parallel with the water surface (horizontal plane), processing is performed in step S33 to make the depression angle correction indicated by earlier-mentioned Equation (1) on the velocity of a tidal current that is calculated in step S32 with respect to each azimuth angle δ, calculate the tidal current velocity components v' of four directions indicated by a depression angle of 0 degrees (horizontal direction) and azimuth angles δ of α degrees, 90+α degrees, 180+α degrees, and 270+α degrees, and store the results of the calculations in the RAM 53 (step S33).

Next, the tidal current velocity components v' of the four directions indicated by a depression angle of 0 degrees and the azimuth angles δ, which were calculated in step S33, are vector-synthesized to calculate the velocity (speed and direction) of the tidal current at the nth analysis depth, and data indicative of the calculated tidal current velocity is stored in the RAM 53 as the tidal current data 53c (step S34). Next, the tidal current velocity indicated by the tidal current data 53c stored in the RAM 53 in step S34 appears on the display device 15 as the velocity of a tidal current at the nth analysis depth (step S35).

Next, a check is performed to determine whether or not the variable n is equal to the number N of analysis depths set in step S22 (step S36). If it is determined in step S36 that the variable n is not equal to the number N of analysis depths (if the query in step S36 is answered "No"), the value 1 is added to the variable n (step S37). Upon completion of step S37, processing returns to step S32. Subsequently, steps S32 to S36 are repeated until the variable n is equal to the number N of analysis depths. This ensures that the velocity of the tidal current is calculated at all target analysis depths for tidal current velocity measurement, which are indicated by the analysis depth data 53a. The calculated velocity of the tidal current at each analysis depth is then displayed on the display device 15.

If, by contrast, it is determined in step S36 that the variable n is equal to the number N of analysis depths (if the query in step S36 is answered "Yes"), a check is performed to determine whether or not the analysis depth data 53a is changed (step S38). If it is determined in step S38 that the analysis depth data 53a is not changed (if the query in step S38 is answered "No"), processing returns to step S26. The ultrasonic beam TB is then transmitted in directions defined by the depression angle θ for the greatest analysis depth and the four azimuth angles δ in order to measure the tidal current velocity at all the analysis depths indicated by the analysis depth data 53a by using the reflection of the transmitted ultrasonic beam TB. If, by contrast, it is determined in step S38 that the analysis depth data 53a is changed (if the query in step S38 is answered "Yes"), processing returns to step S22. The depression angle θ of the ultrasonic data TB is then newly set in accordance with the changed analysis depth data 53a, and the ultrasonic beam TB is transmitted and received at the newly set depression angle θ to measure the tidal current velocity at all the newly set analysis depths.

As described above, even when a plurality of analysis depths are set, the tidal current meter 12 according to the fourth embodiment transmits the ultrasonic beam TB at a depression angle θ appropriate for one analysis depth and uses the reflection of the transmitted ultrasonic beam TB to measure the tidal current velocity at each selected analysis depth. Consequently, in marked contrast to the tidal current meter 12 according to the first embodiment, which measures the tidal current velocity at each of selected analysis depths by transmitting and receiving the ultrasonic beam TB at a depression angle θ appropriate for each of the selected analysis depths, the tidal current meter 12 according to the fourth embodiment reduces the number of transmissions/receptions of the ultrasonic beam TB. This makes it possible to measure the tidal current velocity more quickly.

Further, the depression angle θ of the ultrasonic beam TB is set as appropriate for the greatest one of selected analysis depths. Therefore, the ultrasonic beam TB can be transmitted to the greatest analysis depth. This makes it possible to properly measure the tidal current at that analysis depth. Furthermore, if the selected greatest analysis depth indicates a shallow place, a small depression angle θ is set for the ultrasonic beam TB. Thus, even if the analysis depth indicates a shallow place, it is possible to suppress a decrease in the frequency resolution and increase the frequency resolution itself. Consequently, the velocity of a tidal current can be accurately measured.

Additionally, the tidal current meter 12 according to the fourth embodiment produces the same effects by using the same configuration as in the first, to third embodiments.

While the present, invention has been described in conjunction with preferred embodiments, it should be understood that the present invention is not limited to those preferred embodiments. The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein. For example, a preferred embodiment may be modified, for instance, by adding one or more parts of the elements included in another embodiment to the preferred embodiment or by replacing one or more parts of the elements included in the preferred embodiment with one or more parts of the elements included in another embodiment. Further, numerical values used in the preferred embodiments are merely exemplary and may obviously be replaced by different numerical values.

The first and fourth embodiments have been described with reference to a case where the depression angle θ of the ultrasonic beam TB is set so that its lower-limit value is 30 degrees. However, the lower-limit value is not limited to 30 degrees. Alternatively, the lower-limit value may be an arbitrary value that is greater than 0 degrees and smaller than the upper-limit value of the depression angle θ. In particular, when the lower-limit value is close to 0 degrees, the velocity of a tidal current at a shallower place can be accurately measured. In another alternative scheme, the depression angle θ may be set to be as small as 0 degrees without defining its lower-limit value. More specifically, the ultrasonic beam TB may be transmitted and received in a horizontal direction. This ensures that the velocity of a tidal current in a surface layer of water can be measured as far as almost no waves are generated on the water surface.

The first and fourth embodiments have been described with reference to a case where the depression angle θ of the ultrasonic beam TB is set so that its upper-limit value is 60 degrees. However, the upper-limit value is not limited to 60 degrees. Alternatively, the upper-limit value may be an arbitrary value that is smaller than 90 degrees and greater than the lower-limit value of the depression angle θ. When the upper-limit value of the depression angle θ is close to 30 degrees, the velocity of a tidal current at a deeper place can be measured. However, as mentioned earlier, the velocity resolution increases when the ultrasonic beam TB is transmitted and received at a small depression angle θ. Therefore, it is preferred that the upper-limit value be as small as possible.

The second embodiment has been described with reference to a case where the depression angle θ of the ultrasonic beam TB for a selected analysis depth is calculated from a calculation formula. However, if the calculated depression angle θ is smaller than a predetermined lower-limit value (for example, 30 degrees), the predetermined lower-limit value (30 degrees) may be used as the depression angle θ. This reduces the influence of the surfaces of waves generated on the water surface. Therefore, the velocity of a tidal current at a shallow place can be properly measured. Further, if the calculated depression angle θ is greater than the predetermined upper-limit value (for example, 60 degrees), the predetermined upper-limit value (60 degrees) may be used as the depression angle θ. This prevents an undue increase in the depression angle θ of the ultrasonic beam TB and avoids a decrease in the velocity resolution.

The first, second, and fourth embodiments have been described with reference to a case where the depression angle θ of the ultrasonic beam TB for a selected analysis depth is determined by the depth-depression angle conversion table 52b or by calculations. Alternatively, however, the user may be allowed to operate the operating button 14 to change the depression angle θ of the ultrasonic beam TB after it is determined in the above-described manner. Such a change in the depression angle θ may be made before the transmission/reception of the ultrasonic beam TB or during the transmission/reception of the ultrasonic beam TB. This enables the user to adjust the depression angle θ of the transmission/reception direction of the ultrasonic beam TB in accordance with a target analysis depth for measuring the velocity of a tidal current. Consequently, the velocity of a tidal current can be accurately measured not only at a shallow place but also at a deep place while the user adjusts the depression angle θ of the ultrasonic beam TB.

In the fourth embodiment, in particular, a value appropriate for the greatest one of selected analysis depths is set as the depression angle θ of the ultrasonic beam TB. Therefore, if a small analysis depth is included in a selection of analysis depths, the velocity of a tidal current at a shallow place might not accurately be measured at a depression angle θ that is set in accordance with the greatest analysis depth. Meanwhile, when the user is allowed to operate the operating button 14 to change the depression angle θ, the velocity of a tidal current at various analysis depths can be accurately measured while the user adjusts the depression angle θ of the ultrasonic beam TB even if small to great analysis depths are selected by the tidal current meter 12 according to the fourth embodiment.

The third embodiment has been described with reference to a case where, when the user selects an analysis depth, the display device 15 opens a screen that prompts the input of a depression angle θ of the ultrasonic beam TB in association with the selected analysis depth. Alternatively, however, the screen prompting for the input of a depression angle θ may display a value indicative of a candidate for the depression angle θ and permit the user to operate the operating button 14 to increase or decrease the displayed value for the purpose of setting the depression angle θ. The candidate for the depression angle θ may be determined from an associated analysis depth by using a depth-depression angle conversion table used, for instance, in the first embodiment or by using a calculation formula used, for instance, in the second embodiment. Consequently, the user can be informed of an estimated value indicative of the depression angle θ appropriate for a user-selected analysis depth. In addition, the estimated value makes it easy for the user to set a depression angle θ appropriate for the user-selected analysis depth.

In the fourth embodiment, as mentioned earlier, if a small analysis depth is included in a selection of analysis depths, the velocity of a tidal current at a shallow place might not accurately be measured at a depression angle θ that is set in accordance with the greatest analysis depth.

As such being the case, the tidal current meter 12 may notify the user of an inaccurate measurement, for instance, by causing the display device 15 to display an inaccurately measured tidal current velocity in a flashing manner or at a lower brightness than a tidal current velocity at a different analysis depth. Alternatively, the tidal current meter 12 may inhibit the display device 15 from displaying an inaccurately measured tidal current velocity.

Further, if it is determined that the velocity of a tidal current at a selected small analysis depth cannot accurately be measured when the ultrasonic beam TB is transmitted and received at a depression angle θ appropriate for the greatest one of selected analysis depths, the depression angle θ appropriate for the selected small analysis depth may be set by the depth-depression angle conversion table 52b or by earlier-mentioned Equation (2) to transmit and receive the ultrasonic beam TB, in addition to transmitting and receiving the ultrasonic beam TB at a depression angle θ appropriate for the greatest analysis depth, and measure the velocity of a tidal current at the selected small analysis depth. This makes it possible to accurately measure the velocity of a tidal current at various analysis depths ranging from a great analysis depth to a small analysis depth.

Moreover, if it is determined that the velocity of a tidal current at a selected small analysis depth cannot accurately be measured when the ultrasonic: beam TB is transmitted and received at a depression angle θ appropriate for the greatest one of selected analysis depths, the control device 50 may exercise control so that the depression angle θ selected as appropriate for the greatest analysis depth is decreased to a depression angle θ at which the velocity of a tidal current at the selected small analysis depth can be accurately measured. This makes it possible to transmit and receive the ultrasonic beam TB at a depression angle θ at which the velocity of a tidal current can be accurately measured at various analysis depths ranging from a great analysis depth to a small analysis depth.

The fourth embodiment has been described with reference to a case where a value appropriate for the greatest one of selected analysis depths is set as the depression angle θ of the ultrasonic beam TB. Alternatively, however, a value appropriate for the smallest analysis depth may be set. Consequently, even if a small analysis depth is included in a collection of the selected analysis depths, it is possible to accurately measure the velocity of a tidal current at the small analysis depth.

In the above instance, there may be a case where the velocity of a tidal current at a great depth cannot be measured. As such being the case, after the depression angle θ of the ultrasonic beam TB is determined, the user may be allowed to operate the operating button 14 to change the depression angle θ before or during the transmission and reception of the ultrasonic beam TB. This enables the user to adjust the depression angle θ of the transmission/reception direction of the ultrasonic beam TB in accordance with a target analysis depth for measuring the velocity of a tidal current. Further, if it is determined that the velocity of a tidal current at a selected great analysis depth cannot, accurately be measured when the ultrasonic beam TB is transmitted and received at a depression angle θ appropriate for the smallest one of selected analysis depths, the depression angle θ appropriate for the selected great analysis depth may be set by the depth-depression angle conversion table 52b or by earlier-mentioned Equation (2) to transmit and receive the ultrasonic beam TB, in addition to transmitting and receiving the ultrasonic beam TB at a depression angle θ appropriate for the smallest analysis depth, and measure the velocity of a tidal current at the selected great analysis depth. This makes it possible to accurately measure the velocity of a tidal current at various analysis depths ranging from a great analysis depth to a small analysis depth.

Further, in the above instance, the depression angle θ set as appropriate for the smallest analysis depth may be increased to a depression angle θ at which the velocity of a tidal current at a great analysis depth can be measured. This makes it possible to transmit and receive the ultrasonic beam TB at a depression angle θ at which the velocity of a tidal current can be accurately measured at various analysis depths ranging from a great analysis depth to a small analysis depth.

Furthermore, a depression angle θ appropriate for the median or average of selected analysis depths may be set as the depression angle θ of the ultrasonic beam TB by using the depth-depression angle conversion table 52b or earlier-mentioned Equation (2). This makes it possible to transmit and receive the ultrasonic beam TB at a depression angle θ at which the velocity of a tidal current can be accurately measured with high probability at various analysis depths ranging from a great analysis depth to a small analysis depth.

The fourth embodiment has been described with reference to a case where the depression angle θ of the ultrasonic beam TB is set by using the depth-depression angle conversion table 52b. The depression angle θ of the ultrasonic beam TB may be set without resort, for example, to the depth-depression angle conversion table 52b or calculations and by allowing the user to operate the operating button 14 as is the case with the third embodiment. This enables the user to adjust the depression angle θ of the transmission/reception direction of the ultrasonic beam TB in accordance with a target analysis depth for measuring the velocity of a tidal current. Consequently, the velocity of a tidal current at various depths ranging from a small depth to a great depth can be accurately measured while the user adjusts the depression angle θ of the ultrasonic beam TB.

The foregoing embodiments have been described with reference to a case where one wave transmission/reception unit 16 formed of an all-around sonar is used to transmit and receive the ultrasonic beam TB at a depression angle θ selected as appropriate for an analysis depth while four different azimuth angles δ are sequentially selected. However, an alternative is to use wave transmission/reception units capable of changing the depression angle θ and transmitting and receiving the ultrasonic beam TB in one of four (or two or more) different directions defined by four (or two or more) different azimuth angles δ and select a depression angle θ of the ultrasonic beam TB transmitted and received by each wave transmission/reception unit as appropriate for an analysis depth. Consequently, the ultrasonic beam TB having a depression angle θ appropriate for an analysis depth can be simultaneously transmitted and received in directions defined by the different azimuth angles δ. This makes it possible to quickly measure the velocity of a tidal current at the analysis depth.

Priority is claimed on Japanese Patent Application No. 2015-010577, filed Jan. 22, 2015, the content of which is incorporated herein by reference.

REFERENCE SIGNS LIST

11 . . . Ship
12 . . . Tidal current meter
14 . . . Operating button (depression angle reception section)
31 . . . Oscillator
27 . . . Scan motor (a part of a drive section)
33 . . . Tilt motor (a part of the drive section)
S4 . . . (Depth setup section
S5 . . . (Depression angle setup section)
S10, S11, S14 . . . (Calculation section)

What is claimed is:
1. A tidal current meter that measures the velocity of a tidal current, the tidal current meter comprising:
an oscillator that transmits an ultrasonic wave into water and receives the reflection of the transmitted ultrasonic wave;
a calculation section that calculates the velocity in accordance with the Doppler shift frequency of the reflection received by the oscillator;
a depression angle setup section that sets a depression angle, the depression angle being the angle formed by the transmission direction of the ultrasonic wave and a horizontal plane; and
a drive section that drives the oscillator in such a manner as to transmit the ultrasonic wave and receive the reflection of the transmitted ultrasonic wave at the depression angle set by the depression angle setup section.

2. The tidal current meter according to claim 1, further comprising:
a depth setup section that sets the depth of water at which the velocity is to be measured;
wherein the depression angle setup section sets the depression angle in accordance with the depth set by the depth setup section.

3. The tidal current meter according to claim 2, wherein, if the depth set by the depth setup section is shallower than a predetermined depth, the depression angle setup section sets a depression angle that is smaller than a depression angle preselected for the predetermined depth.

4. The tidal current meter according to claim 1, further comprising:
a depression angle reception section that receives the input of information about the depression angle that a user intends to set;
wherein the depression angle setup section sets the depression angle in accordance with the input of information that is received by the depression angle reception section.

5. The tidal current meter according to claim 2, further comprising:
a depression angle reception section that receives the input of information about the depression angle that a user intends to set;
wherein the depression angle setup section sets the depression angle in accordance with the input of information that is received by the depression angle reception section.

6. The tidal current meter according to claim 3, further comprising:
a depression angle reception section that receives the input of information about the depression angle that a user intends to set;
wherein the depression angle setup section sets the depression angle in accordance with the input of information that is received by the depression angle reception section.

7. The tidal current meter according to claim 1, wherein the drive section drives the oscillator in such a manner as to transmit the ultrasonic wave and receive the reflection of the transmitted ultrasonic wave at a depression angle set by the depression angle setup section while two or more azimuth angles are sequentially selected; and wherein, when the oscillator is driven by the drive section, the calculation section calculates the velocity in accordance with the Doppler shift frequencies of reflected waves that are received at the depression angle set by the depression angle setup section while the two or more azimuth angles are sequentially selected.

8. The tidal current meter according to claim 2, wherein the drive section drives the oscillator in such a manner as to transmit the ultrasonic wave and receive the reflection of the transmitted ultrasonic wave at a depression angle set by the depression angle setup section while two or more azimuth angles are sequentially selected; and wherein, when the oscillator is driven by the drive section, the calculation section calculates the velocity in accordance with the Doppler shift frequencies of reflected waves that are received at the depression angle set by the depression angle setup section while the two or more azimuth angles are sequentially selected.

9. The tidal current meter according to claim 3, wherein the drive section drives the oscillator in such a manner as to transmit the ultrasonic wave and receive the reflection of the transmitted ultrasonic wave at a depression angle set by the depression angle setup section while two or more azimuth angles are sequentially selected; and wherein, when the oscillator is driven by the drive section, the calculation section calculates the velocity in accordance with the Doppler shift frequencies of reflected waves that are received at the depression angle set by the depression angle setup section while the two or more azimuth angles are sequentially selected.

10. The tidal current meter according to claim 4, wherein the drive section drives the oscillator in such a manner as to transmit the ultrasonic wave and receive the reflection of the transmitted ultrasonic wave at a depression angle set by the depression angle setup section while two or more azimuth angles are sequentially selected; and wherein, when the oscillator is driven by the drive section, the calculation section calculates the velocity in accordance with the Doppler shift frequencies of reflected waves that are received at the depression angle set by the depression angle setup section while the two or more azimuth angles are sequentially selected.

11. The tidal current meter according to claim 5, wherein the drive section drives the oscillator in such a manner as to transmit the ultrasonic wave and receive the reflection of the transmitted ultrasonic wave at a depression angle set by the depression angle setup section while two or more azimuth angles are sequentially selected; and wherein, when the oscillator is driven by the drive section, the calculation section calculates the velocity in accordance with the Doppler shift frequencies of reflected waves that are received at the depression angle set by the depression angle setup section while the two or more azimuth angles are sequentially selected.

12. The tidal current meter according to claim 6, wherein the drive section drives the oscillator in such a manner as to transmit the ultrasonic wave and receive the reflection of the transmitted ultrasonic wave at a depression angle set by the depression angle setup section while two or more azimuth angles are sequentially selected; and wherein, when the oscillator is driven by the drive section, the calculation section calculates the velocity in accordance with the Doppler shift frequencies of reflected waves that are received at the depression angle set by the depression angle setup section while the two or more azimuth angles are sequentially selected.

\* \* \* \* \*